US007920714B2

(12) United States Patent
O'Neil

(10) Patent No.: US 7,920,714 B2
(45) Date of Patent: Apr. 5, 2011

(54) METHOD AND APPARATUS FOR COMPARING DOCUMENT FEATURES USING TEXTURE ANALYSIS

(75) Inventor: David Giles O'Neil, Ottawa (CA)

(73) Assignee: Canadian Bank Note Company, Limited, Ottawa, Ontario (CA)

( * ) Notice: Subject to any disclaimer, the term of this patent is extended or adjusted under 35 U.S.C. 154(b) by 975 days.

(21) Appl. No.: 11/496,166

(22) Filed: Jul. 31, 2006

(65) Prior Publication Data

US 2008/0030798 A1 Feb. 7, 2008

(51) Int. Cl.
*G06K 9/00* (2006.01)

(52) U.S. Cl. ........ 382/100; 382/135; 382/141; 382/209; 382/210

(58) Field of Classification Search .................. 382/100, 382/135, 141, 209, 210
See application file for complete search history.

(56) References Cited

U.S. PATENT DOCUMENTS

| | | | | |
|---|---|---|---|---|
| 5,485,312 | A * | 1/1996 | Horner et al. | 359/561 |
| 5,822,436 | A * | 10/1998 | Rhoads | 380/54 |
| 5,943,131 | A * | 8/1999 | Dausmann et al. | 356/457 |
| 6,516,078 | B1 * | 2/2003 | Yang et al. | 382/100 |
| 6,535,638 | B2 * | 3/2003 | McGrew | 382/210 |
| 6,865,001 | B2 * | 3/2005 | Long et al. | 359/2 |
| 7,213,757 | B2 | 5/2007 | Jones et al. | |
| 7,313,250 | B2 * | 12/2007 | Moskowitz et al. | 382/100 |
| 2003/0187798 | A1 | 10/2003 | McKinley et al. | |
| 2004/0158724 | A1 | 8/2004 | Carr et al. | |
| 2004/0263911 | A1 | 12/2004 | Rodriguez et al. | |
| 2005/0100204 | A1 * | 5/2005 | Afzal et al. | 382/135 |
| 2005/0129282 | A1 * | 6/2005 | O'Doherty et al. | 382/112 |

FOREIGN PATENT DOCUMENTS

CA 2384112 A1 3/2001

* cited by examiner

*Primary Examiner* — Tom Y Lu
(74) *Attorney, Agent, or Firm* — Seager, Tufte & Wickhem LLC

(57) ABSTRACT

Systems and methods for assisting in the determination of the authenticity of security documents based on known characteristics of similar but authentic security documents. The system and methods use digital processing to capture a digital image of the document being examined and they use a feature localization or detection technique to search for a specific feature in the document based on a stored image of a similar feature from an authentic document. Once the feature on the subject document has been found, the digital image of the localized feature is transformed, by applying mathematical transforms or other image/mathematical operators, such that the result will have distinguishing characteristics that can be derived or analyzed. When the distinguishing characteristics have been analyzed, these are then compared to the stored distinguishing characteristics of similar features from known authentic documents. Based on the comparison, a score is then generated that is indicative of how similar or how different the distinguishing characteristics of the feature being examined are from the features from known authentic documents. The system may also be used such that multiple features from a single document are assessed and scored separately from one another with a final aggregate or weighted score being provided to the user for the whole document.

20 Claims, 29 Drawing Sheets

METHOD AND APPARATUS FOR COMPARING DOCUMENT FEATURES USING TEXTURE ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

1. Field of Invention

The present invention relates to security documents and methods for validating or determining the authenticity of such documents. Specifically, the present invention relates to systems and methods for use in assisting users in determining if a document under examination is authentic or not.

2. Description of the Related Prior Art

Forgery of high value identification documents is a growing concern, especially in light of increased security threats worldwide. Identification documents may include, but are not limited to, passports, VISA and identification cards. In order to counter attempts to forge such identification documents, a variety of security features have been incorporated therein. Such security features include ultraviolet (UV) threads, infrared (IR) printing, watermarks, micro printing, specialized laminates, machine-readable code and the like. As will be appreciated by those in the art, the security features on a given identification document, such as a passport, will vary between countries and even within a country based on the date of issue. As will also be appreciated, such features are normally detected and verified by a document reader, various brands of which are widely available in the market.

Despite all of the above measures to prevent counterfeiting, forged documents continue to be developed which mirror authentic documents and which therefore escape detection by such document readers or their associated operators. In order to address this deficiency, a superior security feature along with an apparatus and method for detecting such a security feature is required.

SUMMARY OF THE INVENTION

The present invention relates to systems and methods for assisting in the determination of the authenticity of security documents based on known characteristics of similar reference security documents. The system and methods use digital processing to capture a digital image of the document being examined and they use a feature localization or detection technique to search for a specific feature in the document based on a stored image of a similar feature from a reference document. Once the feature on the subject document has been found, the digital image of the localized feature is transformed, by applying mathematical transforms or other image/mathematical operators, such that the result will have distinguishing characteristics that can be derived or analyzed. When the distinguishing characteristics have been analyzed, these are then compared to the stored distinguishing characteristics of similar features from reference documents. Based on the comparison, a score is then generated that is indicative of how similar or how different the distinguishing characteristics of the feature being examined are from the features from reference documents. The system may also be used such that multiple features from a single document are assessed and scored separately from one another with a final aggregate or weighted score being provided to the user for the whole document.

In accordance with one aspect of the invention there is provided a method of determining a level of similarity between a feature associated with a subject document and expected characteristics of said feature, the method comprising:

a) obtaining a digital image of at least a portion of said document;

b) isolating said feature in said digital image c) gathering data from an analysis of said feature d) comparing data gathered in step c) with expected data from expected characteristics of said feature e) generating a score based on a comparison between said data and said expected data wherein said expected characteristics are based on methods used to manufacture said subject document.

In accordance with another aspect of the invention, there is provided a method for determining a printing process used to create a document, the method comprising:

a) selecting at least one test to be applied to said document;

b) obtaining a digital image of a relevant area of said document c) applying said at least one test to said image of said relevant area d) gathering data from said at least one test e) retrieving reference data related to an expected printing process f) comparing said reference data with data gathered from said at least one test g) determining a score based on a level of similarity between said reference data and said data gathered from said at least one test.

In accordance with yet another aspect of the invention, there is provided computer readable media having embodied thereon computer instructions for executing a method of determining a level of similarity between a feature associated with a subject document and expected characteristics of said feature, the method comprising:

a) obtaining a digital image of at least a portion of said document;

b) isolating said feature in said digital image c) gathering data from an analysis of said feature d) comparing data gathered in step c) with expected data from expected characteristics of said feature e) generating a score based on a comparison between said data and said expected data wherein said expected characteristics are based on methods used to manufacture said subject document.

The advantages of the invention are now readily apparent.

Further features and advantages of the invention will be apparent from the detailed description which follows together with the accompanying drawings.

BRIEF DESCRIPTION OF THE DRAWINGS

A better understanding of the invention will be obtained by considering the detailed description below, with reference to the following drawings in which:

FIG. 10 depicts an example of a sample subject image in which the reference digital image of FIG. 9 must be searched for;

DESCRIPTION OF THE PREFERRED EMBODIMENT

Figure 1:
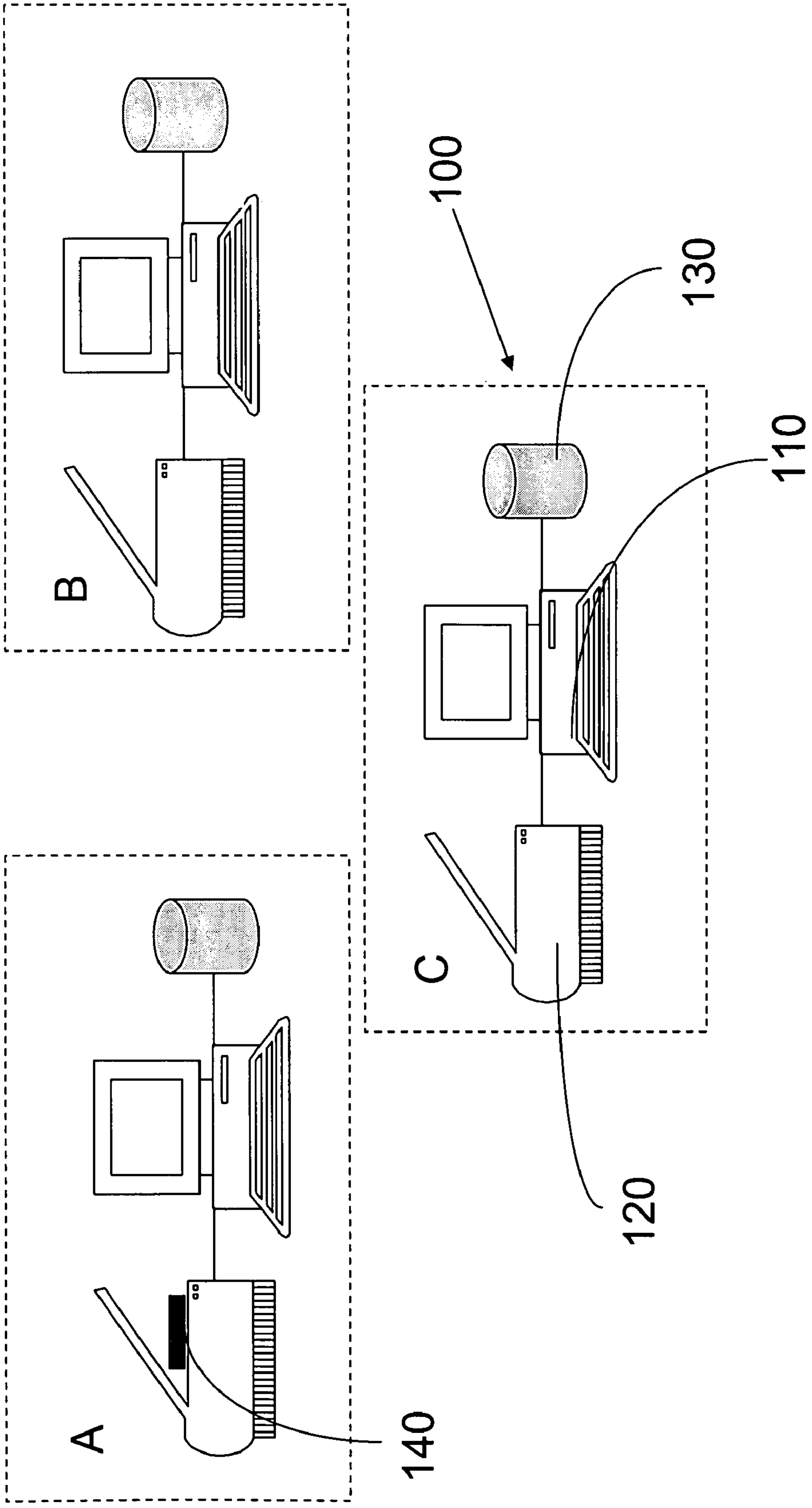
FIG. 1 depicts a stand alone document comparison system.

Referring to FIG. 1, an overview of the document comparison system (DCS) (shown generally at 100) in which the present invention functions is provided. The DCS 100 is comprised of a general purpose computer 110 which may utilize, for example, a Windows XP™ operating system produced by Microsoft™ Corporation. The general purpose computer includes a monitor, input device such as a keyboard and mouse, hard drive and processor, such as an Intel™ Pentium™ 4 processor, cooperating with the operating system to coordinate the operation of the aforementioned components. As those in the art will appreciate, general purpose computer 110 could be any commercially available, off-the shelf computer including a laptop or similar device and all such devices are meant to be included within the scope of the present invention.

General purpose computer 110 communicates with travel document reader 120 and external storage device 130. As will be appreciated by those in the art, data stored in external storage device 130 may be alternately stored on the hard drive integral to general purpose computer 110. Travel document reader 120 is used to input features associated with a security document 140 (such as a passport, visa, identity card, etc.) into DCS 100 for analysis, to assist the operator with a determination as to whether security document 140 is authentic. In operation, the operator places security document 140 onto an image capture surface associated travel document reader 120 and a portion or all of security document 140 is then exposed to various light sources. Travel document reader 120 is designed to recognize documents that are compliant with the relevant standards and specifications governing such documents. These specifications and standards may be set by the authorities which issue these documents as well as international organizations such as the ICAO (International Civil Aviation Organization). As part of the image capture process, the security document 140 may be exposed to various forms of light such as ultraviolet (UVA and UVB), infrared (IR), red/green/blue (RGB) and white light to determine if certain expected features are present. More specifically, light emitting diodes (LEDs) expose security document 140 to UV, IR and RGB light, while a fluorescent light source exposes security document 140 to white light. In all cases, the light reflected from the surface of security document 140 is captured by a charge coupled device (CCD) or complementary metal-oxide semiconductor (CMOS) sensor, either of which converts the light into electronic signals that can be digitally processed.

Figure 2:
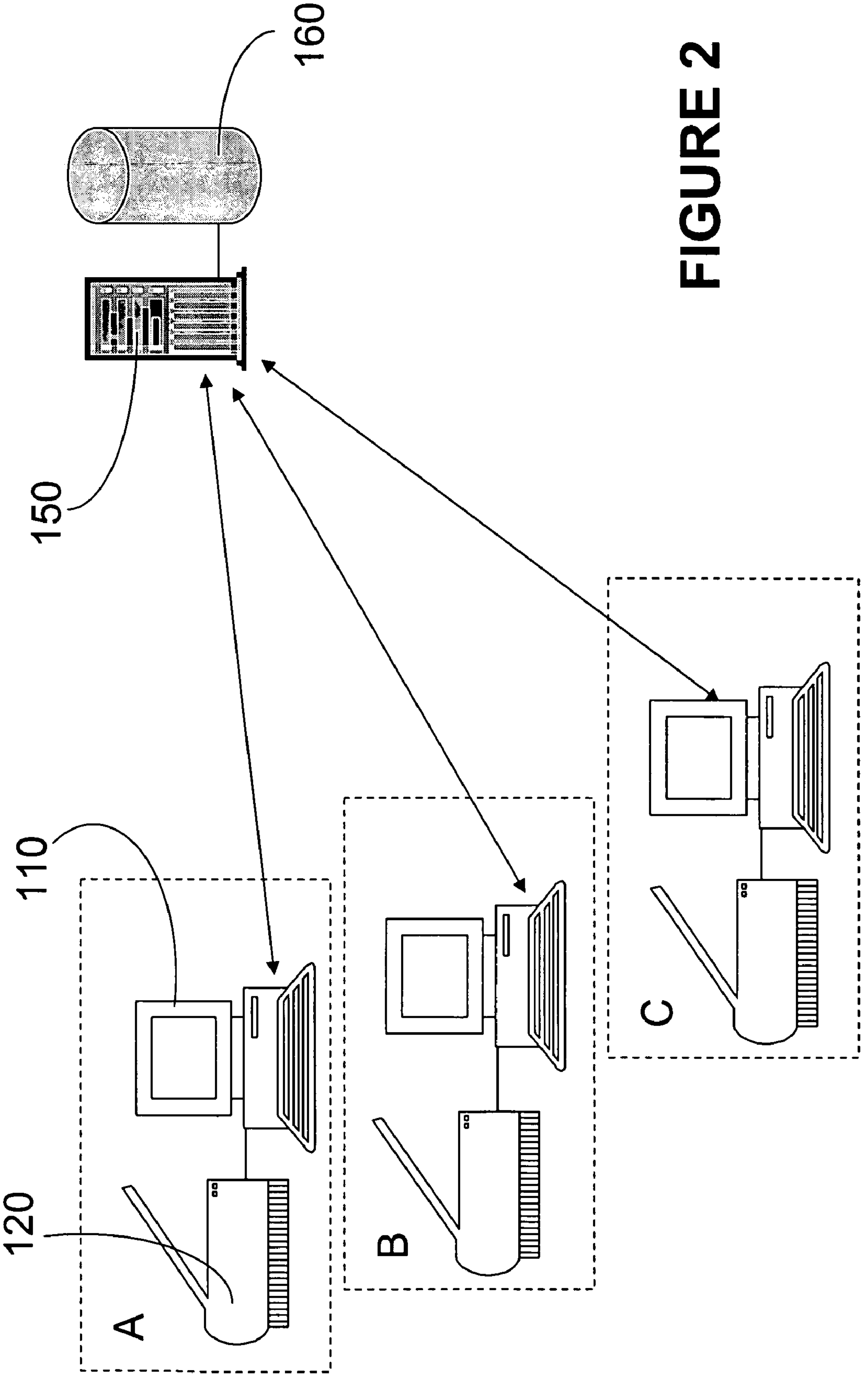
FIG. 2 depicts a networked document comparison system.

In the configuration shown in FIG. 1, document comparison system 100 operates in a stand alone mode at locations A, B and C such as at a customs or security officer's post located at, for example, an airport or other country point of entry. As shown in FIG. 2, an alternate configuration includes each of a plurality of general purpose computers 110 communicating with a central server 150 in a client-server relationship well known to those in the art. Central server 150 communicates with a central storage device 160.

General purpose computer 110 has stored thereon, document comparison software, which processes the captured information and compares it to information contained in local security feature/image database 130, to determine if security document 140 is authentic. Alternately, document comparison software could be stored on central server 150 and accessed by each of the plurality of general purpose computers 110 attached thereto. As will be appreciated by those in the art, travel document reader 120 typically includes firmware for accomplishing various reader specific tasks such as acknowledging receipt of security document 140 onto the scanning surface and capturing various the images discussed above. This firmware operates seamlessly with the document comparison software in the analysis of security document 140. More specifically, the firmware associated with travel document reader 120 sends and receives requests for information related to a specified document template, as will be discussed in more detail below.

Figure 3:
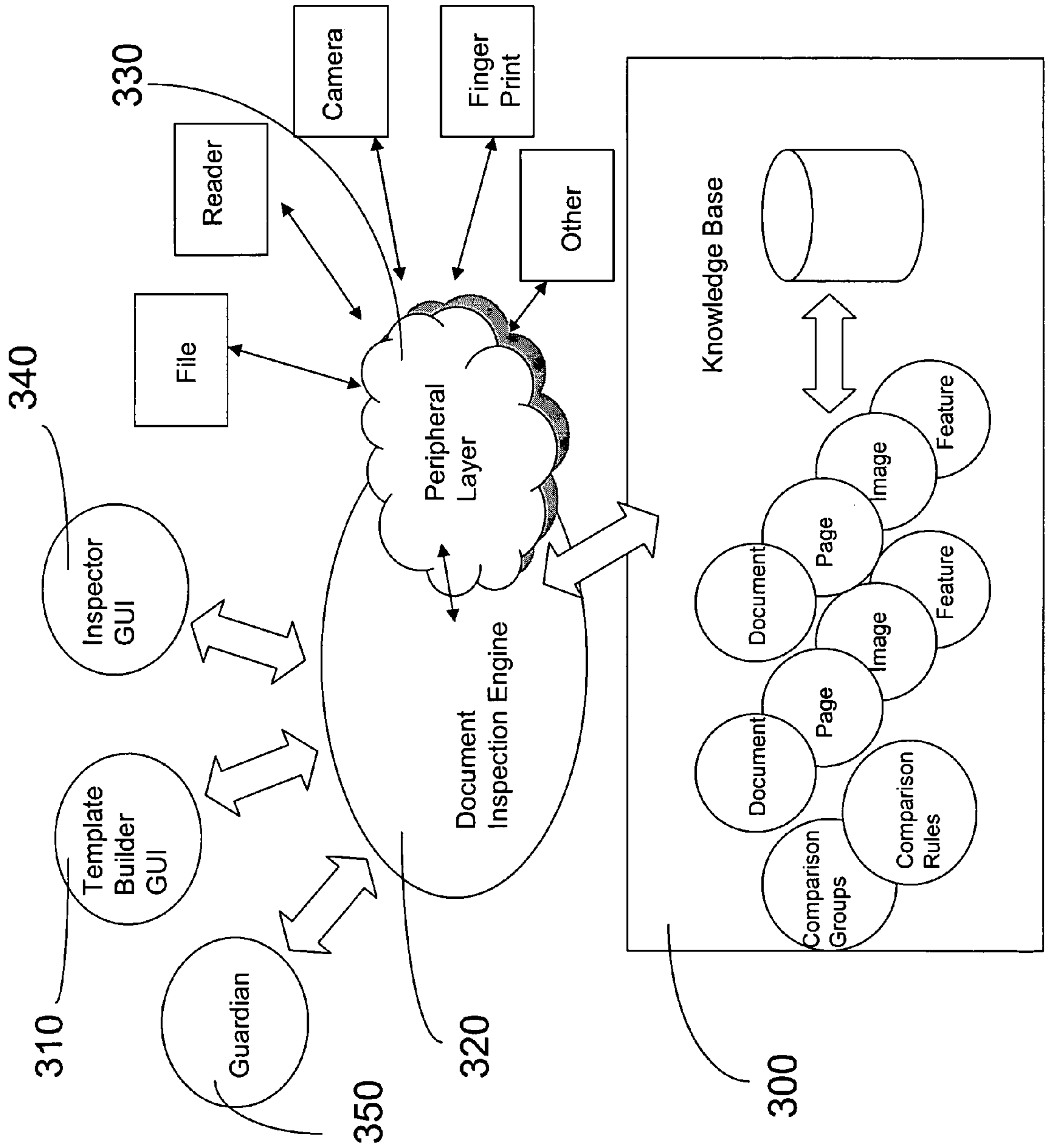
FIG. 3 depicts the software components of the document comparison system.

Document comparison software is comprised of several modules as depicted in FIG. 3. One such module is knowledge base 300. DCS 100 uses knowledge base 300 to perform its inspection tasks. Knowledge base 300 (the contents of which are stored in storage devices 130 or 160) contains known templates for a variety of security documents 140 that are identified by a document signature. Each template holds the instructions on what and how to locate, process, inspect, compare and score the various entities on the template. The document content is arranged in a hierarchical manner so as to facilitate cross document, cross page, cross image, and same document, same page, same image inspections. The elements of knowledge base 300 are further defined as follows:

(a) Document: A collection of page(s) or data groups to be inspected. An example might be the passport page and visa page. Properties and comparison groups can be attached to a document;

(b) Page: A logical grouping of images or binary representations of data. A page can have properties to be inspected, e.g. page size;

(c) Image: A binary data representation of an entity that has feature(s) to be inspected, e.g. captured with a different light source to expose certain features;

(d) Feature: A significant object within the image entity, e.g. MRZ (machine readable zone) feature, a Maple Leaf pattern. A feature contains the data required to locate, process and score parts of or the entire image. Properties can be attached to a feature.

(i) Signature features (to be discussed below) have an added functionality for selecting templates;

(ii) Self-learning features have the ability to locate and identify most or all of their properties. Such features can use processors and comparators to help with this process;

(e) Property: An element within an entity that can be inspected and scored, e.g. location, colour or text;

(f) Comparison Rule: A rule has an operator that is applied to two properties;

(g) Comparison Group: A collection of comparison rules to form more complex rules to perform extra checking on the security document 140. The comparison group has an optional activation and deactivation time. An example of a comparison group is to alert the operator that all male travelers, aged between 25-40 of country UTO are to be asked for a second piece of identification during the period of Apr. 1 to Apr. 2, 2005;

(h) Signature: A special property that is a unique identification of an entity (e.g. document, page, image or feature) within an entity group. The document type, country code and the document series id could form a document signature.

Figure 4B:
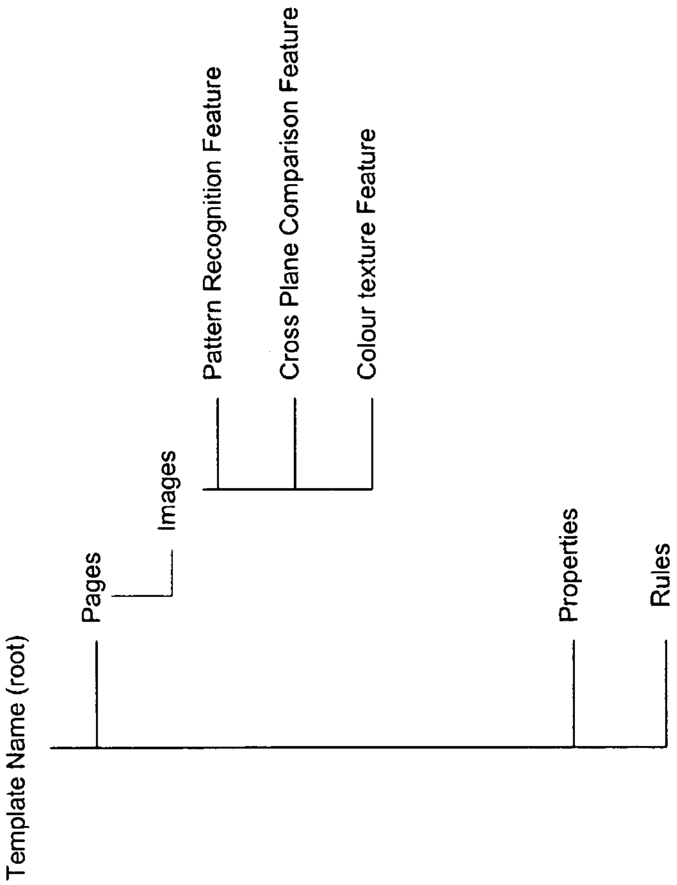
FIG. 4B depicts an example of a document template and a number of image features associated therewith.
Figure 4A:
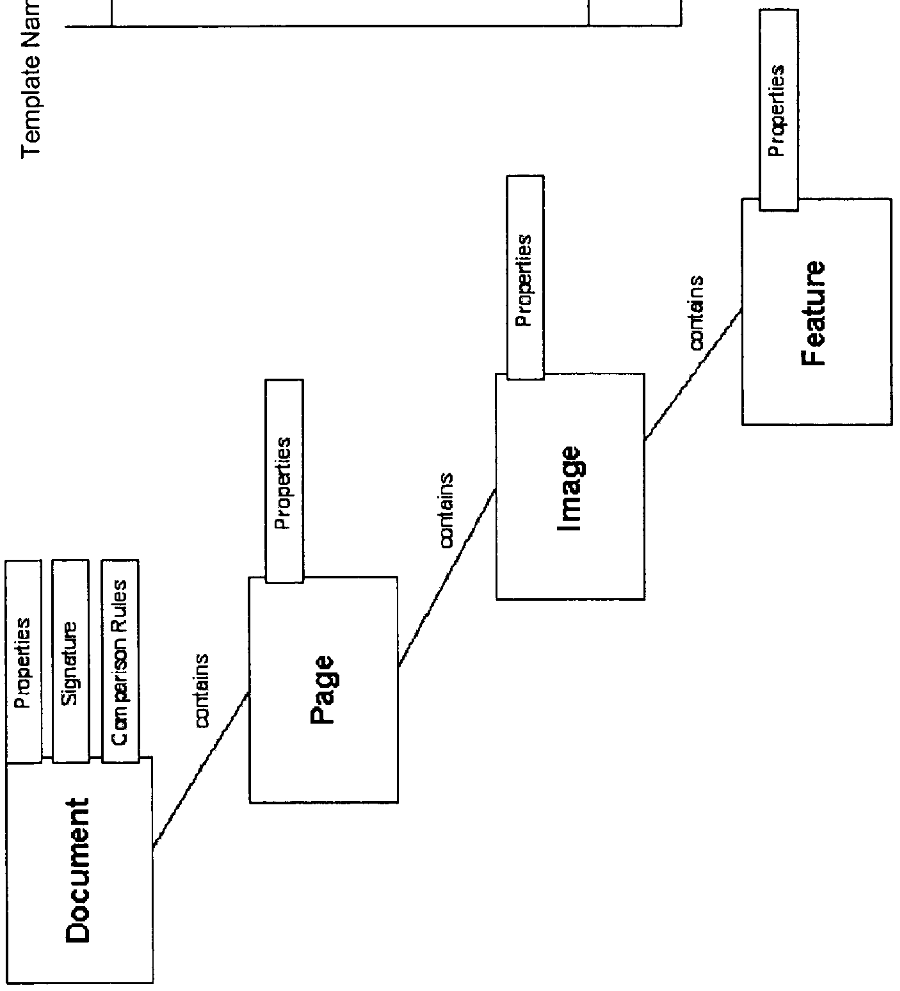
FIG. 4A depicts the hierarchical organization of the elements of the knowledge base.

The hierarchical arrangement of the above-noted elements is depicted in FIG. 4A, with an example of a document template and a number of image features associated therewith depicted in FIG. 4B.

Another module contained in the document comparison software is a template builder graphical user interface (GUI) 310 for assisting the user of DCS 100 with the management of knowledge base 300 and its associated templates. Template builder GUI 310 allows the creation, deletion and renewal of the data that represents a document template. This basic functionality of template builder GUI 310 can either be done in a step-by-step manner for specific entities within a document template or the user can have the tool create a generic layout of a document template with default values. Template builder GUI 310 also provides an interactive visual representation of the hierarchal data in knowledge base. This allows the user to easily scan various document templates contained within knowledge base 300 and quickly apply those changes that are required.

Figure 5:
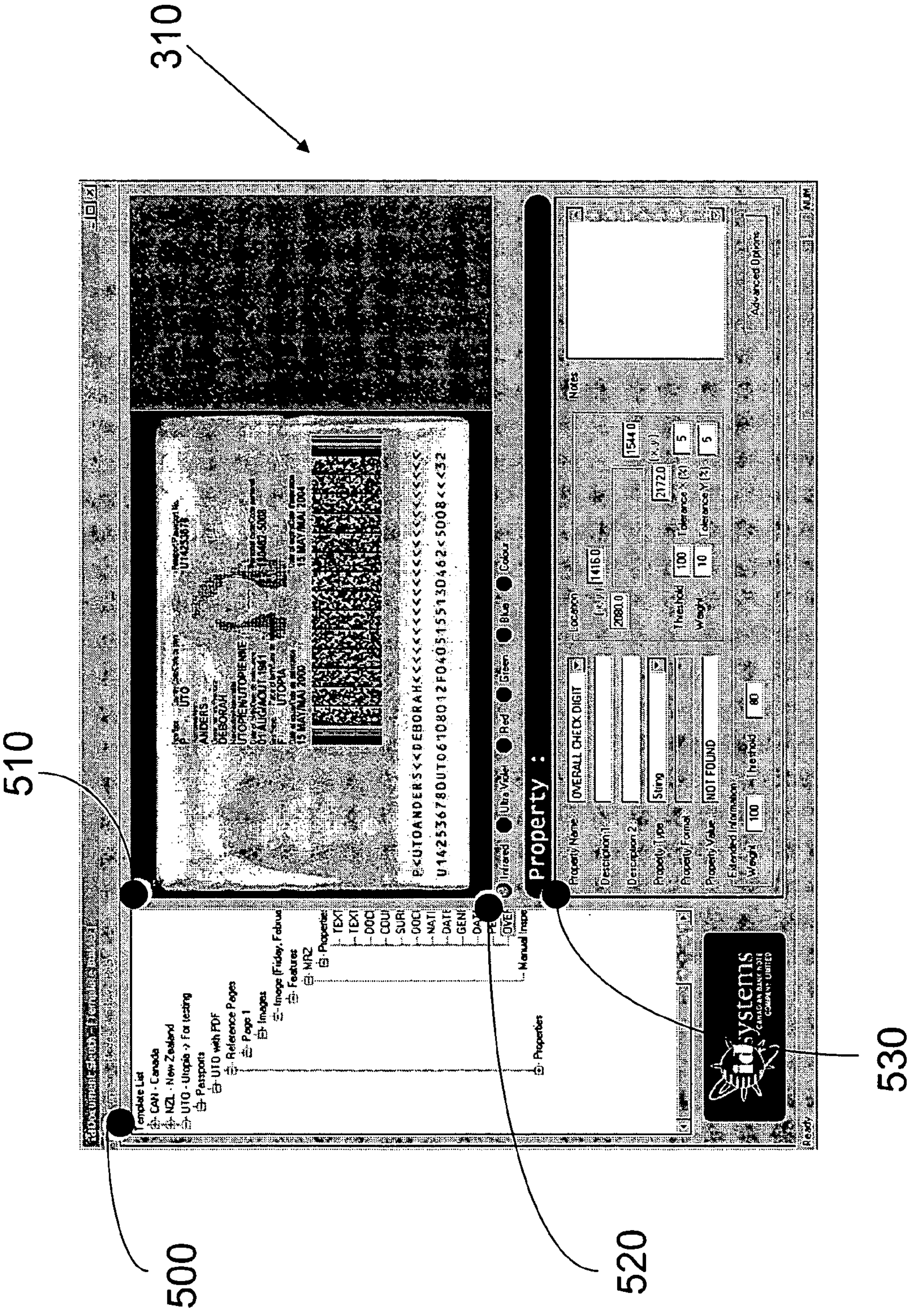
FIG. 5 depicts a template builder graphical user interface (GUI)

Referring to FIG. 5, a template builder GUI 310 is depicted. Window 500 is the previously mentioned hierarchal representation of the existing templates in knowledge base 300. The commands for adding, removing and maintaining templates are instigated from this tree list. Visual display area 510 provides the user with a representation of the data with which the user is currently working. This could be graphical, binary, etc. Indicator lights 520 inform the user what data source the current data was obtained from during template creation. Finally, data entry fields 530 provide information for each of the different types of entities that make up a template. Template builder GUI 310 dynamically changes the set of fields for data entry depending on which entity is being manipulated. These entities include properties, features, images, reference pages, documents, rules, and portfolios previously discussed.

Referring again to FIG. 3, a further module of the document comparison software is a document inspection engine 320 that works in collaboration with knowledge base 300 to score a document or portfolio of documents based on inspection instructions. Document inspection engine 320 may alternately reside in document authentication server 150 and obtain images from one or more security documents 140 scanned at one or more networked travel document readers 120. As shown in FIG. 3, travel document reader 120 is just one example of the devices that reside in peripheral layer 330, with which document inspection engine communicates to obtain inspection data.

When security document 140 is inserted into travel document reader 120 it automatically sends signature image(s) and/or signature feature(s) to the document inspection engine 320. Signature image(s) and/or signature feature(s) are used to determine a document type (e.g. passport) upon which further validation processing can be initiated. More specifically, using the retrieved signature images(s) and/or signature feature(s) document inspection engine 320 determines one or more matching templates. Each template defines the additional data to be retrieved using travel document reader 120 to validate security document 140.

Figure 6B:
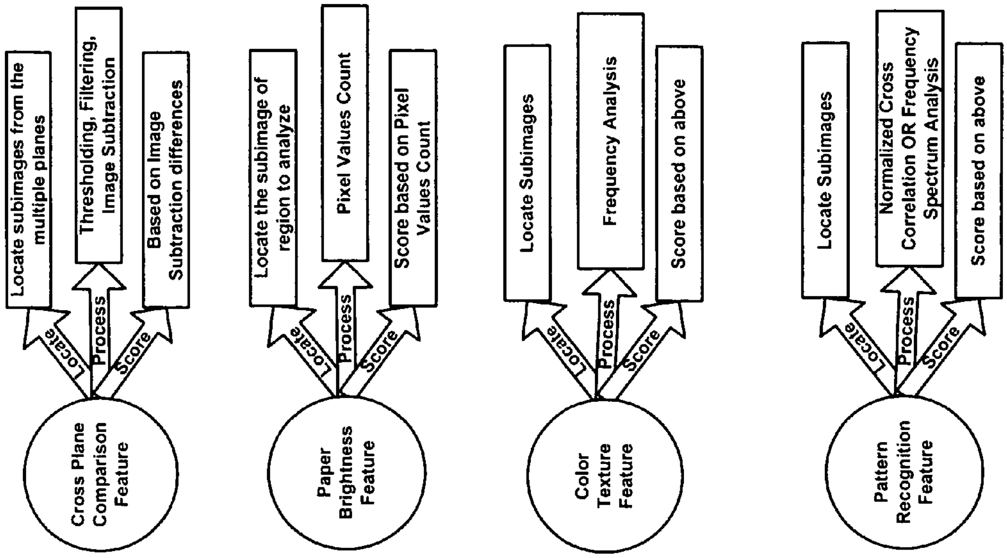
FIG. 6B depicts a series of example features used to validate an identified security document.
Figure 6A:
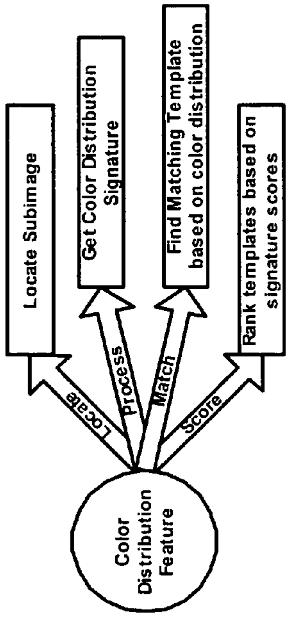
FIG. 6A depicts an example signature feature used by the document inspection engine to identify the security document under consideration.

Important enablers for matching templates are signature features. Generally speaking, document inspection engine 320 can locate, process and score features, but signature features also implement a "find matching templates" process. The "find matching templates" process calculates a unique signature for the security document 140 under analysis. This process preferably utilizes a scoring mechanism which ranks the matching templates. From the list of ranked matching templates, the highest scored template is chosen, and this template will be used in the validation of the security document 140 under analysis. Optionally, an operator can select the preferred template from the list. FIG. 6A depicts an example of a signature feature that looks at the colour distribution of sub images to calculate a unique signature for an incoming image. This signature is used to search, score and rank matching templates.

Once the security document 140 under analysis is identified, additional features associated with security document 140 are located, processed and scored by document inspection engine 320 to determine if security document 140 is authentic. Feature locating, processing and scoring are most commonly methods exported from image and data processing libraries or DLLs. For example a machine readable zone (MRZ) feature uses an image utility for page segmentation and a multi font OCR engine will be called to recognize the letters. MRZ scoring is based on advanced comparators and libraries that have been developed according to ICAO standards. Another example is a pattern recognition feature that locates sub images and uses a normal cross correlation algorithm which generates a number used for scoring. FIG. 6B depicts example features which are located, processed and scored as part of the validation process for security document 140.

When all data is received for security document 140, document inspection engine 320 starts the scoring process. The hierarchical structure of knowledge base 300 is key to this process. Scoring security document 140 is a user-weighted summary of scoring all pages, all comparison groups and all properties attached to security document 140. Scoring pages is a user-weighted summary of scoring all data, images and scoring all properties attached to the page. Scoring data and images is a user-weighted summary of scoring all features and properties attached to the page. To score a feature it must first be located then processed before scoring is performed. Scoring a feature involves a user-weighted summary of all properties, property locations and feature location scores. As will be discussed in relation to FIGS. 7A and 7B, the results of the scoring are displayed in an inspector GUI (element 340 in FIG. 3)

Figure 7A:
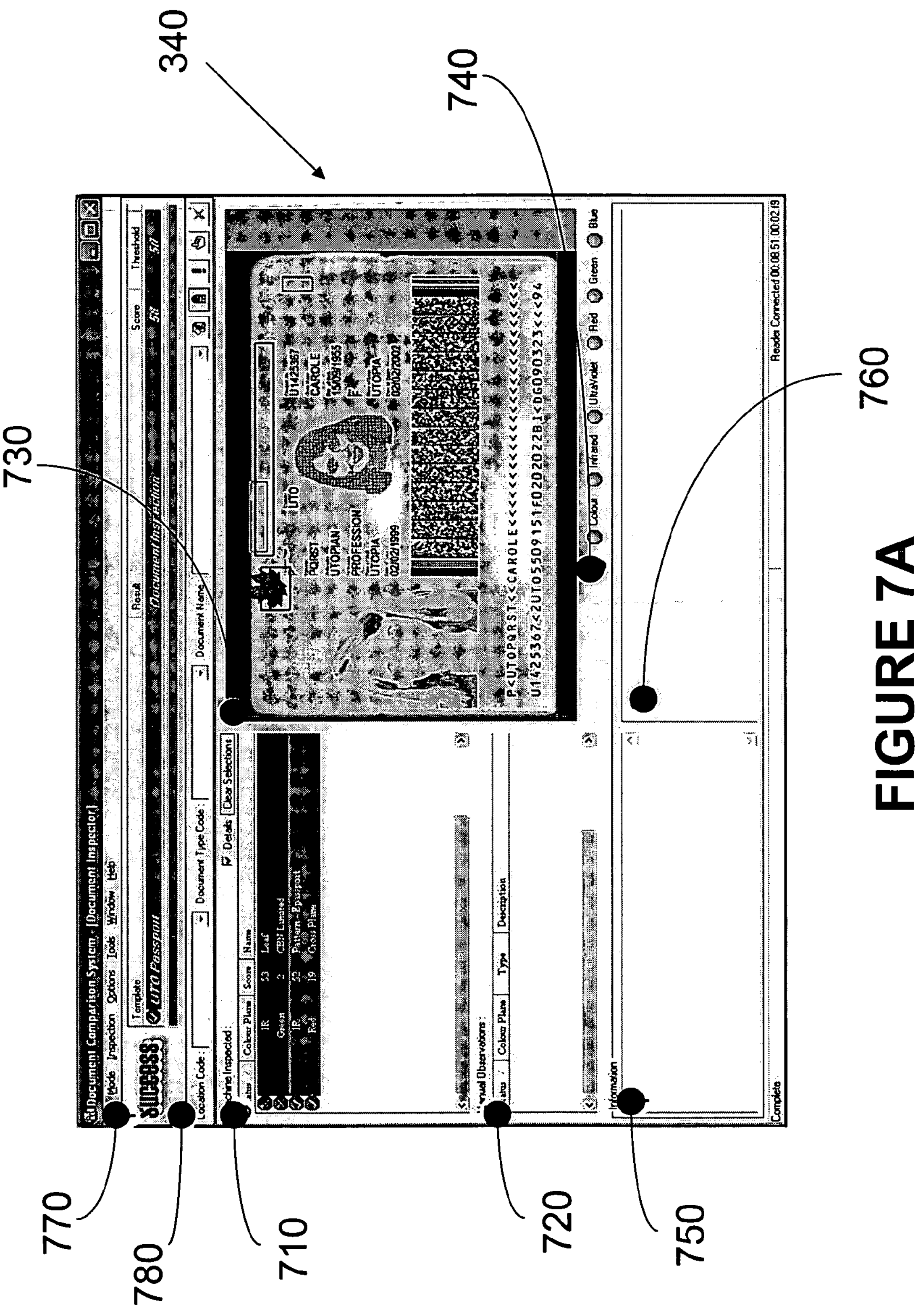
FIG. 7A depicts an inspector GUI.

Referring to FIGS. 3 and 7A to 7C, the last major module of the document comparison software is inspector GUI 340. At the end of the inspection process, the inspection results are presented via the inspector GUI 340 to an operator such as a customs officer. As shown in FIG. 7A, inspector GUI 340 includes: a list of machine inspected features 710, properties and rules where the results are signified by colour and a numerical score; a list of important features 720 that the user needs to be aware of but cannot be processed and inspected electronically by DCS 100; an image display area where those items listed in 710 and 720 are boxed on the image; a set of buttons 740 indicating what color planes were obtained and inspected for the template; a text information pane 750 that displays relevant notes pertaining to the item selected from either 710 or 720; a visual information pane 760 that displays relevant images pertaining to the item selected from either 710 or 720.

Figure 7B:
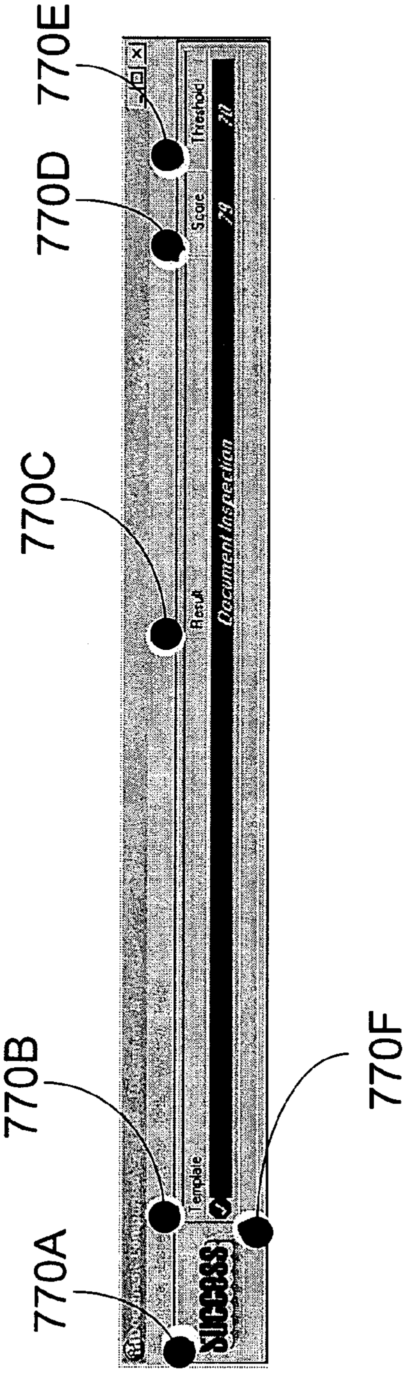
FIG. 7B depicts the display bar of the FIG. 7A inspector GUI.

Additionally, inspector GUI 340 includes a display bar 770. As shown in FIG. 7B display bar 770 includes: a large bold single word 770A, which is easy to see and interpret quickly to indicate the status of the last operation performed; the name of the document template 770B that was used during the last document inspection process; a single sentence 770C highlighting any important information the user may need to know about the last operation that was performed; a numerical score 770D that relates a confidence level of all computations performed on the inspected document in relation to the chosen document template; A numerical value 770E indicating the threshold limit for passing or failing the inspection process; and a progress bar 770F (shown in pre-inspection mode) that is activated during the inspection process to indicate to the user that an operation is taking place.

Figure 7C:
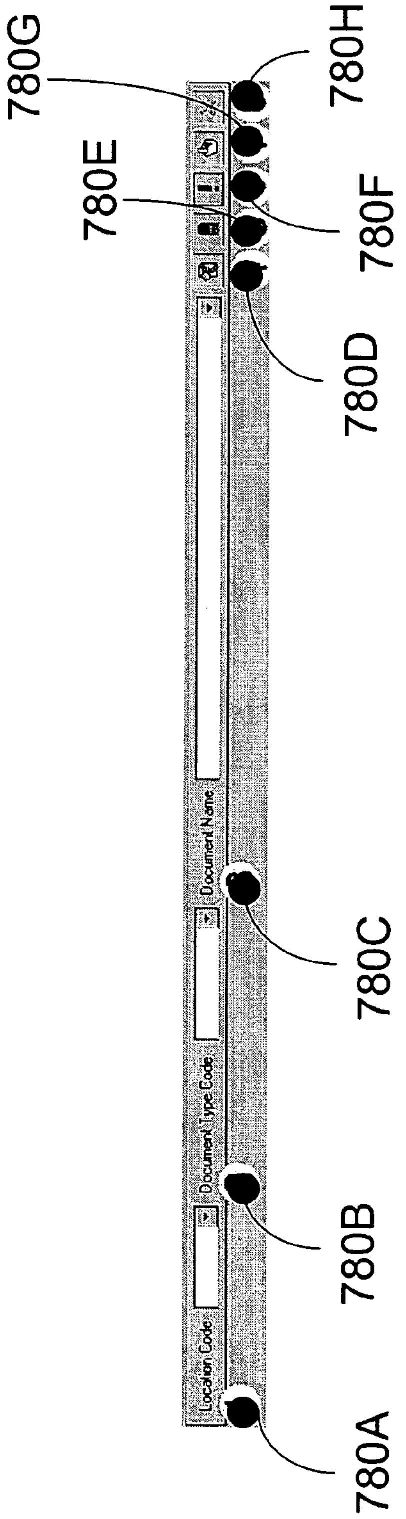
FIG. 7C depicts the search bar of the FIG. 7A inspector GUI.

Finally, inspector GUI includes a search bar 780. As shown in FIG. 7C, search bar 780 includes: location code entry 780A to specify what country, province, county or any other similar geopolitical designation to which a document template belongs; document type code entry 780B to specify to what set of documents the template belongs. Examples include visa, passport, financial card and identifying certificates; document name entry 780C to specify the exact name of the document template that the user may desire to use for an inspection; a "Browse" button 780D, which utilizes the information from the three above-mentioned entry fields to display template information in the main inspection window; a "Clear" button 780E, which clears all data retrieved from the knowledge database 300 from the screen; an "Execute" button, 780F which utilizes the information from the above-mentioned entry fields while instigating an inspection process for acquired images; an "Auto-Selection" button 780G, which turns ON or OFF the option of the user to select a template during the inspection process when a perfect template match cannot be acquired. In the ON state a list of templates is presented to the user for use. In the OFF state the best match template is used for the inspection process; and a "Cancel" button 780H, which interrupts and stops an inspection process before it is complete.

As depicted in FIG. 3, an optional module of the document comparison software includes a guardian component 350 which assigns user access privileges to view and modify knowledge base 300 when either template builder GUI or inspector GUI 340 are in use. A user with insufficient privileges is denied access to certain areas of knowledge base 300 in template builder mode or to certain results in inspection mode. For example, if the system administrator does not want the user to even be aware that a certain feature for a specified document exists and can be analyzed then access to that feature in knowledge base 300 will be denied and the results of that feature analysis will remain hidden.

Figure 8:
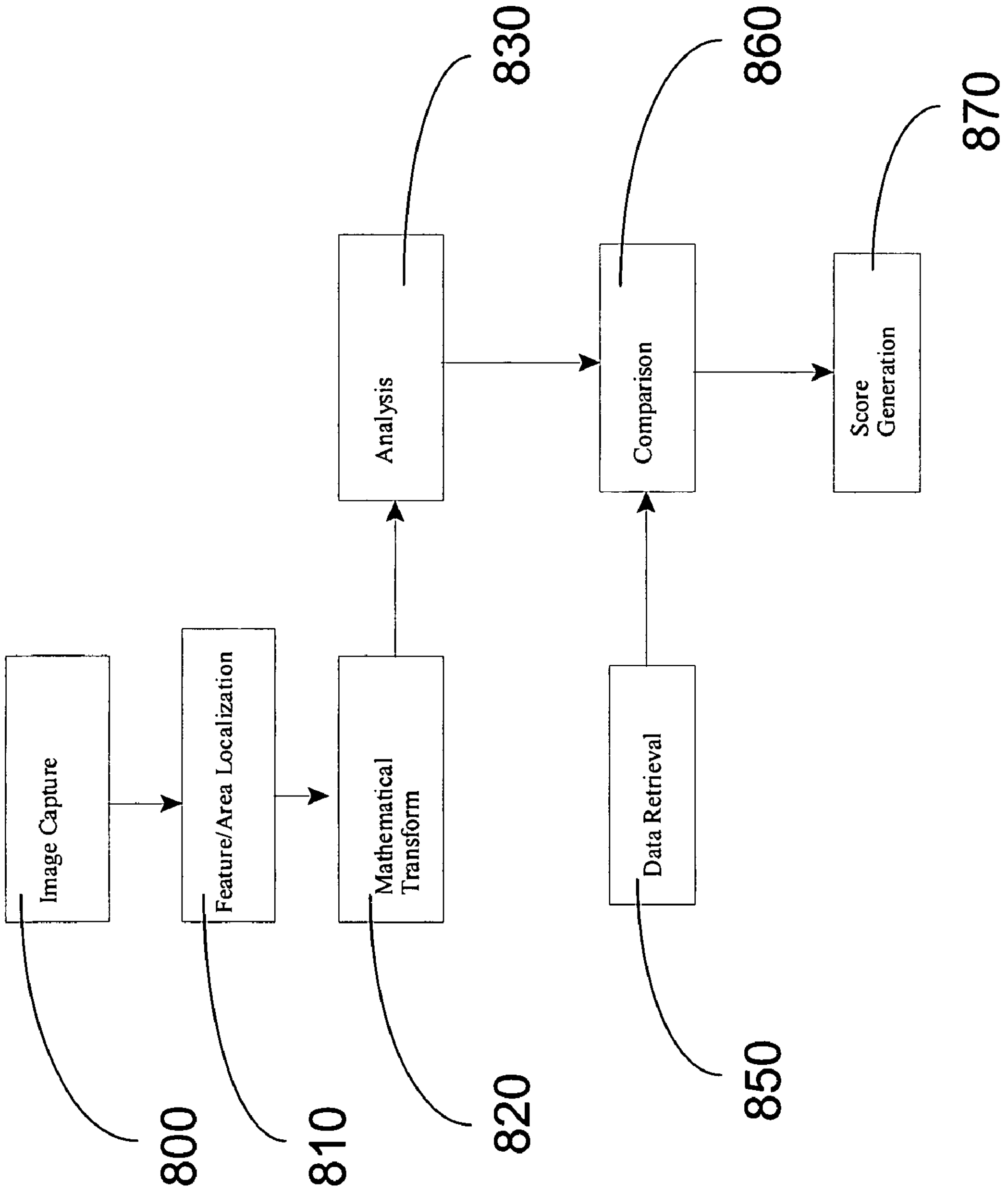
FIG. 8 depicts a block diagram of the software modules used by the system of the invention.

Referring to FIG. 8, a block diagram of software modules used by the document inspection engine 320 is illustrated.

An image capture module 800 communicates with the scanner 120 to result in a digital image or a digital representation of a page of the security document 140. Once the digital image of the page (e.g. a digital image 805 of a passport page shown in FIG. 7A) is captured, a specific area or feature of the image may be localized or isolated or found in the digital image by the feature/area isolation module 810. The feature/area isolation module 810 detects and localizes and isolates features or areas of the digital image based on a stored digital representation or image of the same feature or area from a reference security document or on specific locations of the document where the feature or area is expected to be present.

When the digital image of the specific area or feature has been isolated, the area or feature is analyzed by the analysis module 830. Data from this analysis is then gathered. Data regarding the feature or area analyzed is, generally, then retrieved by a data retrieval module 850. The data gathered by analysis module is then compared by the comparison module 860 with data retrieved by the data retrieval module 850.

After the digital image of the localized or isolated feature or area has been processed by the feature/area isolation module 810, the resulting image from the processing is received by an analysis module 830. The analysis module 830 analyzes the resulting image from the isolation module 810 and produces a result that can be compared with stored data derived from a reference security document. The result of the analysis module 830 can then be used by the comparison module 860 to determine how close or how far the feature being examined is from a similar feature on a reference security document. The data for the reference security document is retrieved by a data retrieval module 850 from the database. Once the relevant data for the relevant feature of the reference security document has been retrieved, this data is compared with the data from the analysis module 830 by the comparison module 860. The result of the comparison is then received by the score generation module 870 which determines a score based on the similarities or closeness between the sets of data compared by the comparison module 860. The score generated may be adjusted based on user selected preferences or user or system mandated weights on the data.

It should be noted that the term "reference document" is used to refer to documents against which subject documents will be compared with. As mentioned above, features are associated with documents such that reference documents will be associated with reference features. Features associated with subject documents are compared with reference features associated with reference documents. These reference documents may be authentic or authenticated documents, meaning documents which are known to be legitimate or have been authenticated as being legitimate and not forgeries. Similarly, reference documents may be inauthentic documents or documents known or proven to be fake, forgeries, or otherwise illegitimate. If the reference document being used is an authentic document, the features associated with a subject document are compared to the features associated with an authentic document to positively determine the presence of features expected to be on an authentic document. As an example, if a feature on the reference document (an authentic document in this example) corresponds very closely (if not exactly) to a similar feature on the subject document, then this is an indication of a possible authenticity of the subject document. On the other hand, if the reference document used is an inauthentic document or a known forgery, then a close correlation between features associated with the subject document and on features associated with the reference document would indicate that the subject document is a possible forgery. The use of an inauthentic document can thereby positively determine the possibility, if not a probability, of a forgery. Similarly, using an inauthentic document as a reference document can negatively determine the possibility of the authenticity of a subject document. This is because if the features of the subject document do not closely correlate with the features of an inauthentic document, then this may indicate the authenticity of the subject document.

It should be noted that the image capture module 800 may be derived from or be found in commercially available software libraries or dynamic link libraries (DLLs). Software and methods for communicating with and receiving digital images from different types of scanning apparatus is well-known in the art of digital scanning and software.

It should further be noted that the analysis performed by the analysis module 830 and the data retrieved by the data retrieval module 850 may be based upon the manufacturing techniques used to create the security document. As such, techniques involved in the printing, layering, or any other method of manufacturing the security document may be used as the basis of the analysis. Thus, if a certain printing technique produces certain characteristics in the finished product and those characteristics are not present in the security document under analysis, this fact can be used to assist in determining the authenticity or inauthenticity of the security document. Similarly, the presence of characteristics not expected of a specific manufacturing process, such as, for example, a specific printing technique, can be used as an indication for determining an authenticity or inauthenticity of a document.

As noted above, to localize or isolate a feature or area of the digital image from the image capture module, the feature/area isolation module 810 is used. The feature or area may be a letter from a machine readable zone, a specific section of the background of the document, a hologram, or any other feature or area susceptible to analysis. One method which may be implemented by this module 810 is based on having a reference digital image of an area or feature being searched for in the digital image from the image capture module 800. The method, in essence, reduces to searching the digital image for an area or feature that matches the smaller reference digital image. This is done by using normalized cross-correlation.

After normalized cross-correlation is applied to a reference digital image and a subject digital image, the resulting image indicates the regions in the subject digital images which most closely matches the reference digital image. The formula for a correlation factor (or the quality of the match between the reference digital image or template and the subject digital image at coordinates c(u,v)) is given as $$c(u, v) = \frac{\sum_{x,y} \overline{f}(x, y)\overline{g}(x-u, y-v)}{\sqrt{\sum_{x,y} \overline{f}(x, y)^2 \sum_{x,y} \overline{g}(x, y)^2}}$$

Thus, the correlation factor equals 1 if there is, at point (u,v), an exact match between the reference digital image and the subject digital image. Another way of calculating the correlation factor is to calculate how different the reference digital image and the subject digital image are at point (u,v). This difference or the "distance" between the two images can be found by using the formula:

$$e(u,v)=\sum_{x,y}(f(x,y)-g(x-u,y-v))^2$$
$$=\sum_{x,y}(f(x,y)^2+g(x-u,y-v)^2-2f(x,y)g(x-u,y-v))$$

Since the first two terms in the summation are constants, then the "distance" decreases as the value for the last term increases. The correlation factor is therefore given by the formula c(u,v)=1−e(u,v). When e(u,v)=0, then there is a perfect match at coordinates (u,v). Once the results are plotted, regions where the correlation is highest (closest to 1) appear in the plot.

To apply the cross correlation to the subject digital image, the average value over a window as large as the reference digital image is subtracted from each pixel value of the subject digital image with the window being centered on the pixel being evaluated. This is very similar to applying an averaging filter to the subject digital image. However, to overcome the issue of average values at the edges of the subject digital image, the subject digital image is normalized by padding the edges with mirror values. To best illustrate the above process, FIGS. 9-13 are provided.

Figure 9:
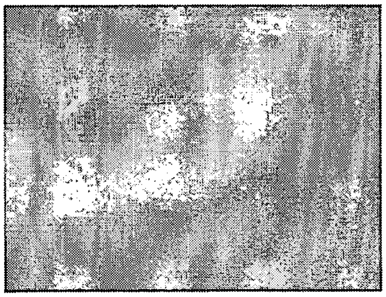
FIG. 9 depicts an example of a reference digital image which must be searched for in the sample subject image of FIG. 10.
Figure 10:
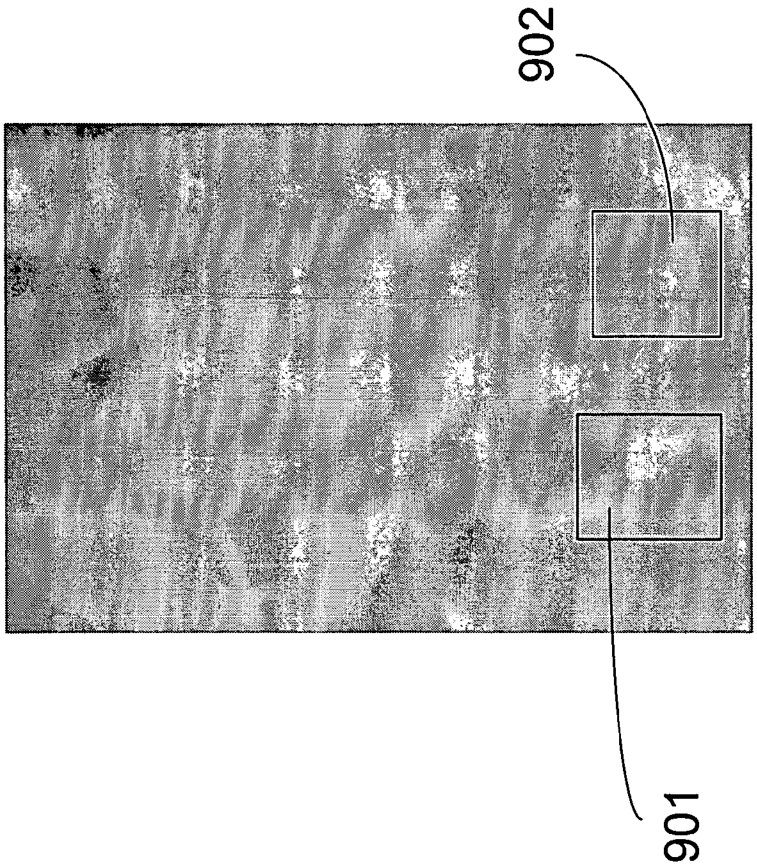
Figure 11:
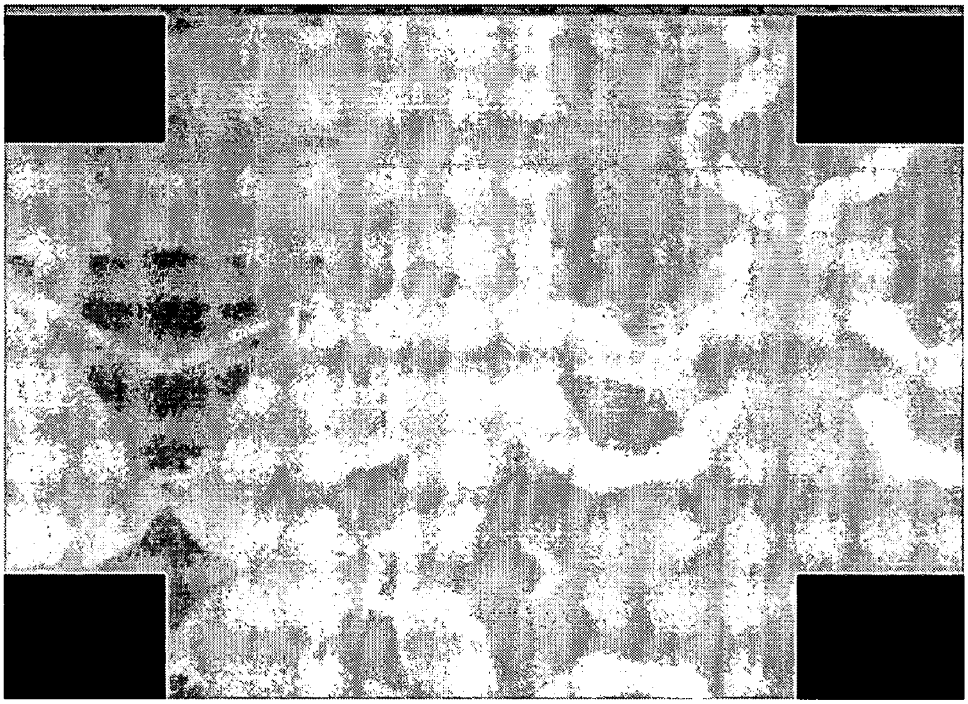
FIG. 11 depicts the sample subject image of FIG. 10 with its edges padded with mirror values.
Figure 12:
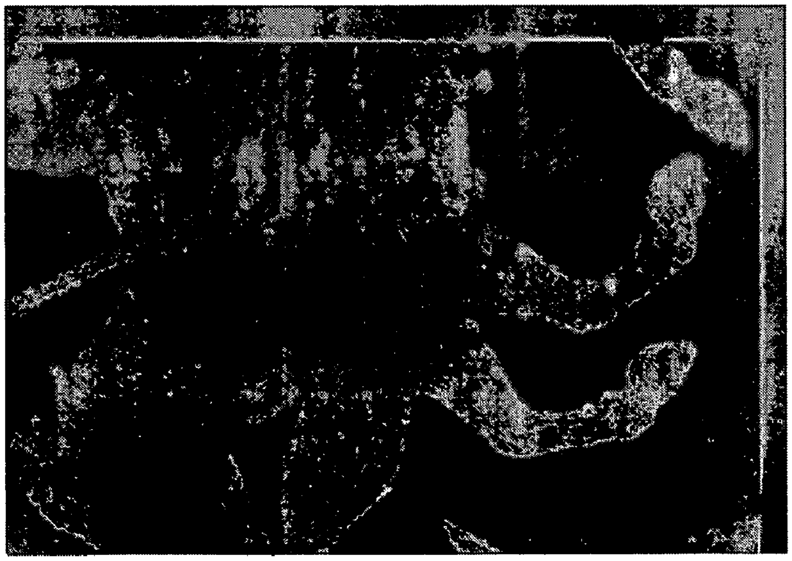
FIG. 12 depicts the normalized version of the subject image of FIG. 10 as derived from the padded image of FIG. 11.

FIG. 9 illustrates a sample reference digital image. FIG. 10 illustrates a sample subject image. Thus, the image in FIG. 9 must be found in the subject image of FIG. 10. To assist the reader, a boxed area in FIG. 10 shows where the reference image may be found. As such, there should be at least one area in FIG. 10 that matches the reference digital image. The issue of average values at the edges of the subject image was raised above and, to address this, the edges of the subject image are padded with mirror values, resulting in FIG. 11. As can be seen in FIG. 11, a mirror image of the edges of the subject image is added to every edge. This process normalizes the subject image to produce FIG. 12 which will be used to search for the reference image. Once normalized cross correlation is applied to FIGS. 9 and 12 and the cross correlation coefficients are calculated at every point, the image in FIG. 13 emerges. As can be seen from FIG. 13, two areas show the strongest potential matches to FIG. 9—the dark patches 890 correspond to the regions 901-902 in FIG. 10 where the closest matches to the reference images are found.

Figure 13:
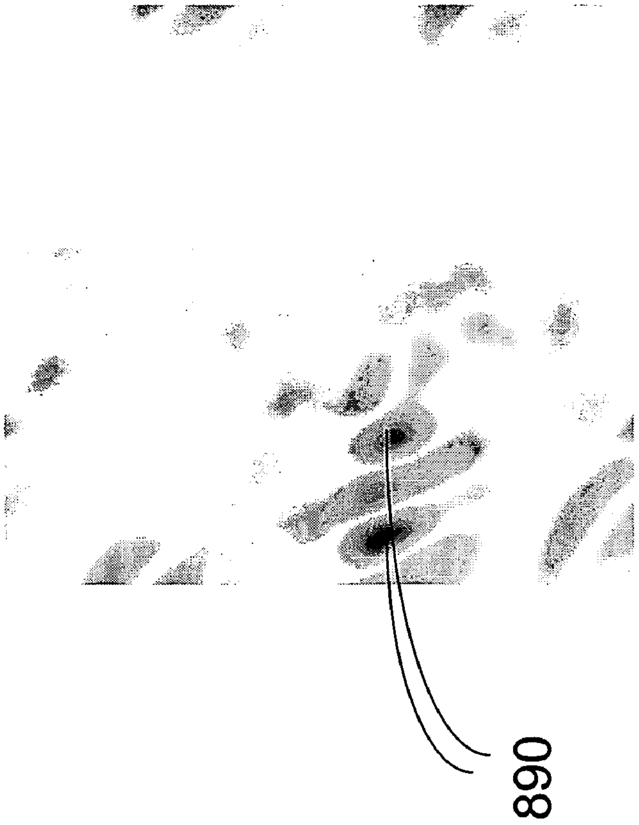
FIG. 13 depicts a plot of the normalized cross correlation coefficients derived from the reference digital image of FIG. 9 and the normalized sample subject image of FIG. 12.
Figure 13A:
FIG. 13A illustrates a sample reference image taken from an authentic document.
Figure 13B:
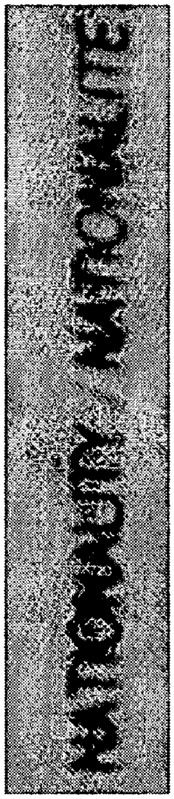
FIG. 13B illustrates a sample image taken from an inauthentic document.
Figure 13C:
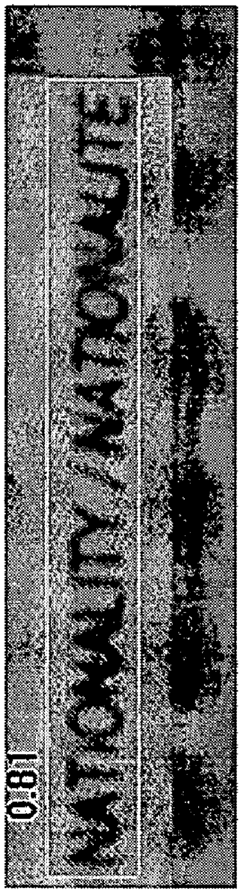
FIG. 13C illustrates the resulting image after normalized cross-correlation is applied to the images in FIGS. 13A and 13B.

Cross correlation can also be used to validate not only the presence/absence of a pattern but also to take into account the edge integrity of the pattern in question. Referring to FIGS. 13A, 13B, and 13C, these figures illustrate one example in which normalized cross correlation is used to take into account edge integrity for authentication purposes. FIG. 13A illustrates a sample reference image from an authentic document while FIG. 13B illustrates an image from an inauthentic document. Normalized cross-correlation determines the level of correlation between the two images. After applying normalized cross-correlation between the two images, FIG. 13C illustrates the result. A distance of 0.81 between the two images is found. Such a score is considered low as a distance of at least 0.9 is to be expected from cross-correlating two images from genuine documents. As can be seen, the blurry edges of the image in FIG. 13B is in contrast to the sharp edges of the image in FIG. 13A. The printing process used to manufacture the document in FIG. 13A produces clear, sharp edges. The printing process used to manufacture the document in FIG. 13B, on the other hand, produces blurry edges.

While the above process localizes the desired matching regions or features, the computational complexity may be daunting as the subject image increases in size. To address this issue, both the reference image and the subject image may both be compressed or reduced in size by the same factor. The normalized cross correlation process set out above can then be applied to these compressed images. Since the area of the reference image has shrunk and since the corresponding area of the subject image has also shrunk, then the mathematical complexity of the calculations similarly shrink. This is because the resolution and the number of pixels being used correspondingly decrease.

It should be noted that the correct reference image to be used in the above process may be determined by the type of security document being examined. Such reference images may therefore be stored in the database and retrieved by the data retrieval module 850 as required. Examples of features/areas which may have reference images stored in the database are microprinting samples, identifier symbols such as the maple leaf in the image in FIG. 7A, and other indicia which may or may not be visible to the naked eye. For non-visible features, the scanner 120 may be configured to illuminate such features by exposing them to an illumination source which produces distinct types of radiation (e.g. white light, blue light, red light, green light, infrared light, ultraviolet A radiation, or ultraviolet B radiation) so that an image of such features may be digitally scanned.

Once the feature/area to be examined has been localized or isolated, an analysis of the isolated image is then performed. In one embodiment, this analysis may take that form of applying a mathematical transform or some other type of numerical processing to the localized or isolated feature by the analysis module 810. The transform or processing may take many forms such as applying a Fast Fourier Transform (FFT) to the image, determining/finding and tracking edges in the image, and other processes. Other types of processing such as shape recognition through contour matching, the use of a neural classifier, and wavelet decomposition may also be used.

In one embodiment, a Fast Fourier Transform (FFT) is applied to the localized image to result in an illustration of the power spectrum of the image. The power spectrum reveals the presence of specific frequencies and this frequency signature can be used to determine how similar one feature is to a similar feature in a reference security document. To illustrate this process, FIGS. 14-21 are provided.

Figure 14:
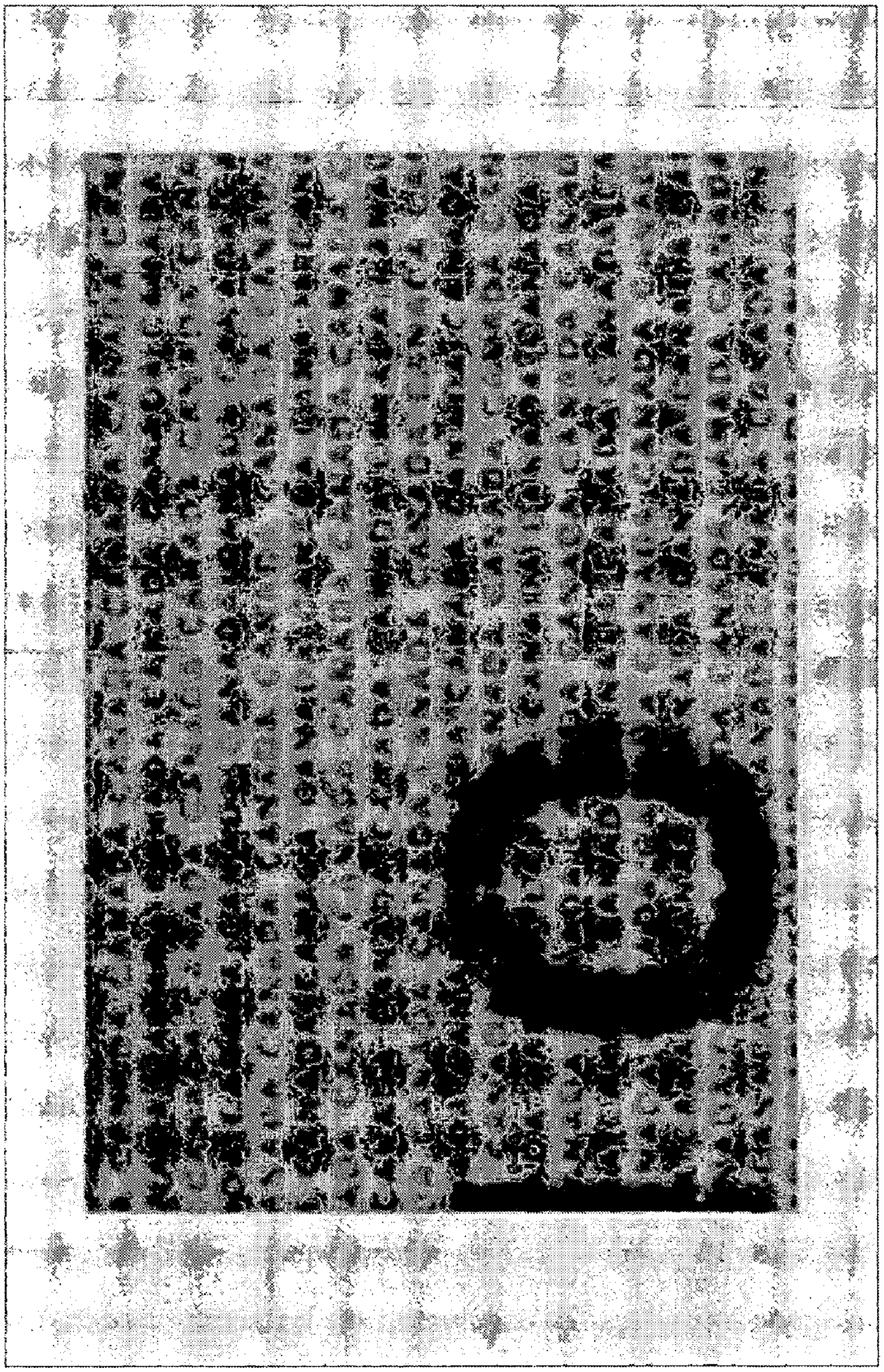
FIG. 14 depicts a sample reference image illustrating an area of a security document containing microprinting.

Referring to FIG. 14, a reference image of an area with a repetitive printing pattern (such as microprinting) is illustrated. This reference image is derived from a reference security document and provides a reference by which subject images may be measured. Once an FFT is applied to the reference image, an image of its power spectrum or frequency spectrum emerges (see FIG. 15). As can be seen from FIG. 15, specific frequencies are present (see circles in FIG. 15). These peaks in the spectrum indicate the presence of frequencies in the power spectrum of authentic documents and that other authentic documents which have the same microprinting pattern should have similar frequencies in their power spectrum. Essentially, the sharpness of the microprinting affects the sharpness, height, and even the presence of the peaks in the spectrum. As such, the less sharp the microprinting, the lesser and the lower are the peaks in the spectrum. Thus, the power spectrum of the subject image is to be compared to the power spectrum of the reference image.

Figure 15:
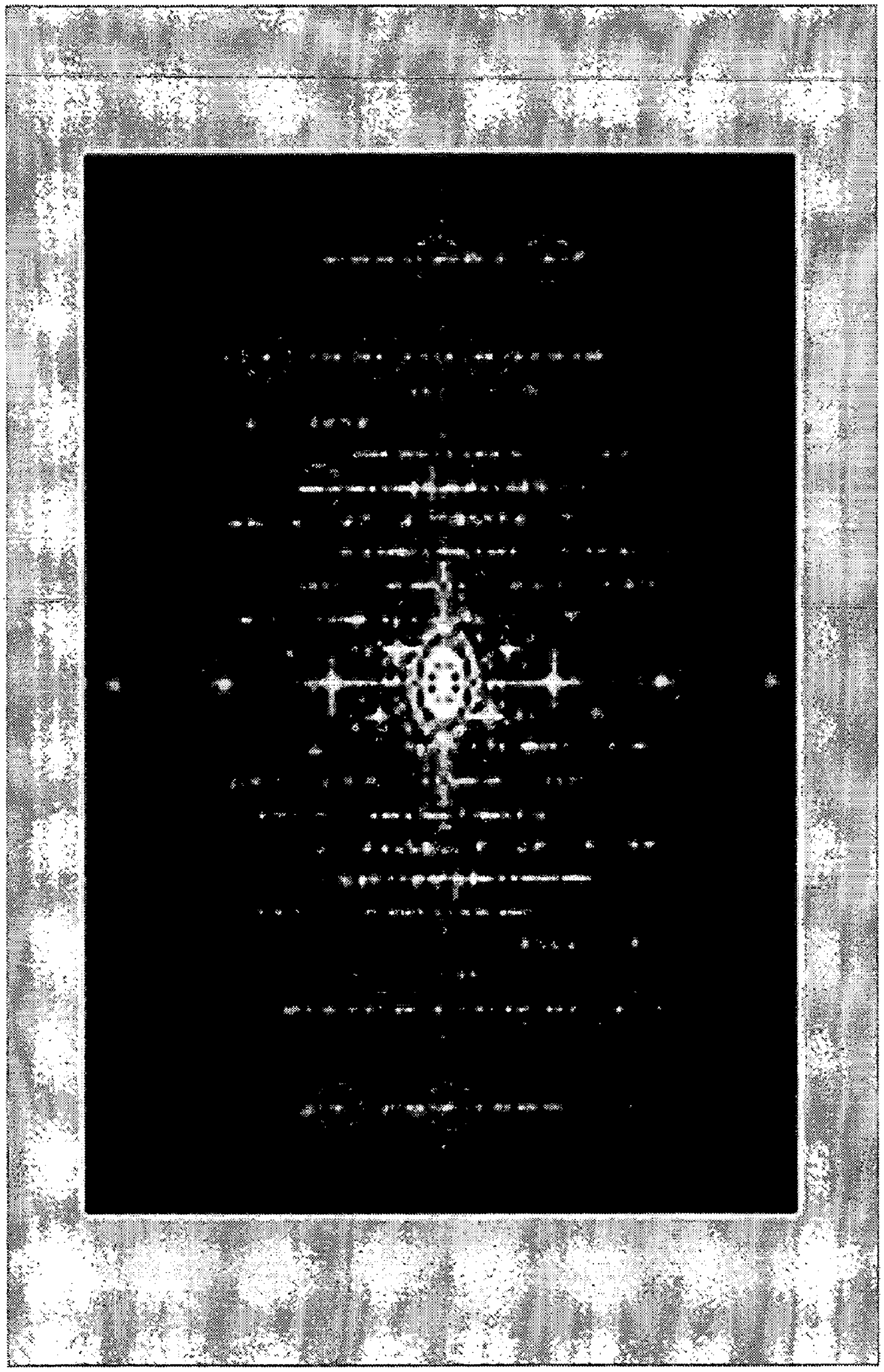
FIG. 15 depicts a power spectrum of the image of FIG. 14 after a Fast Fourier Transform is applied to the image.
Figure 16:
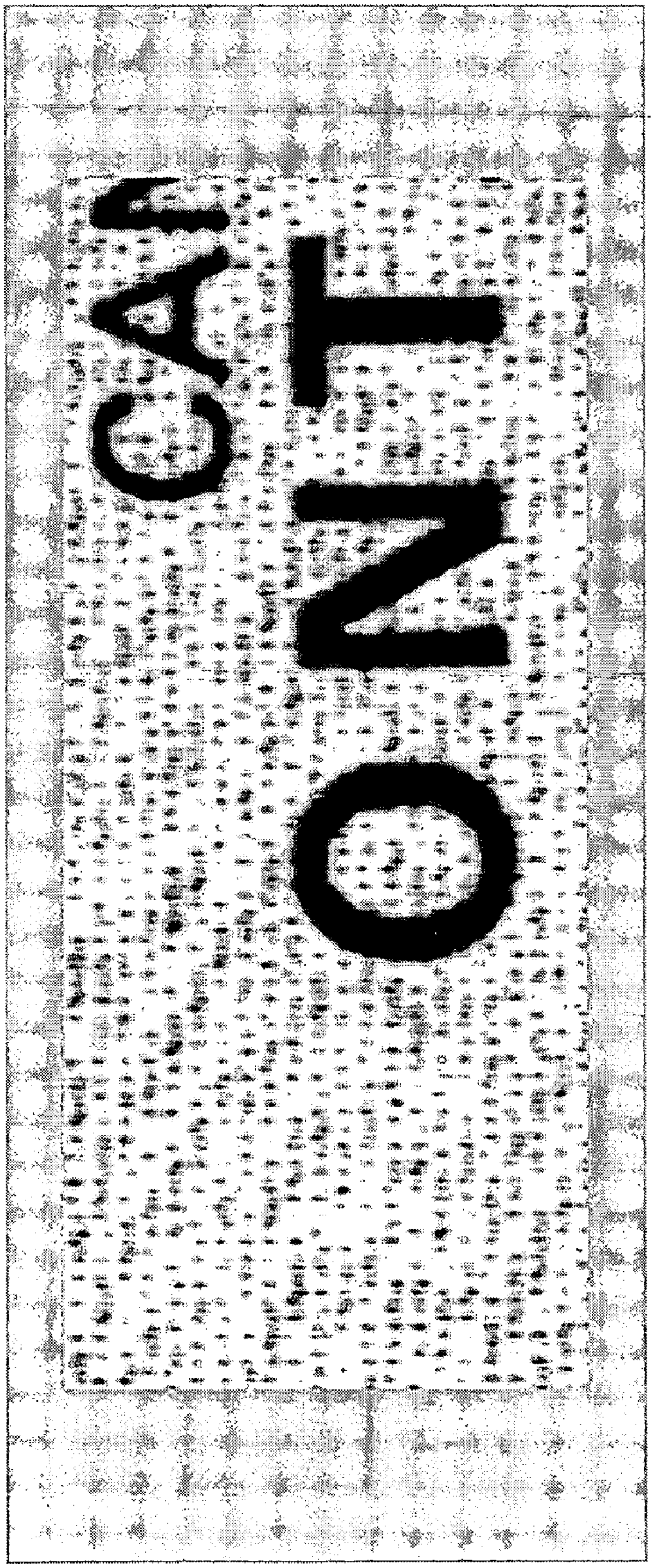
FIG. 16 depicts a sample subject image of an area in an inauthentic document where microprinting has been attempted.
Figure 17:
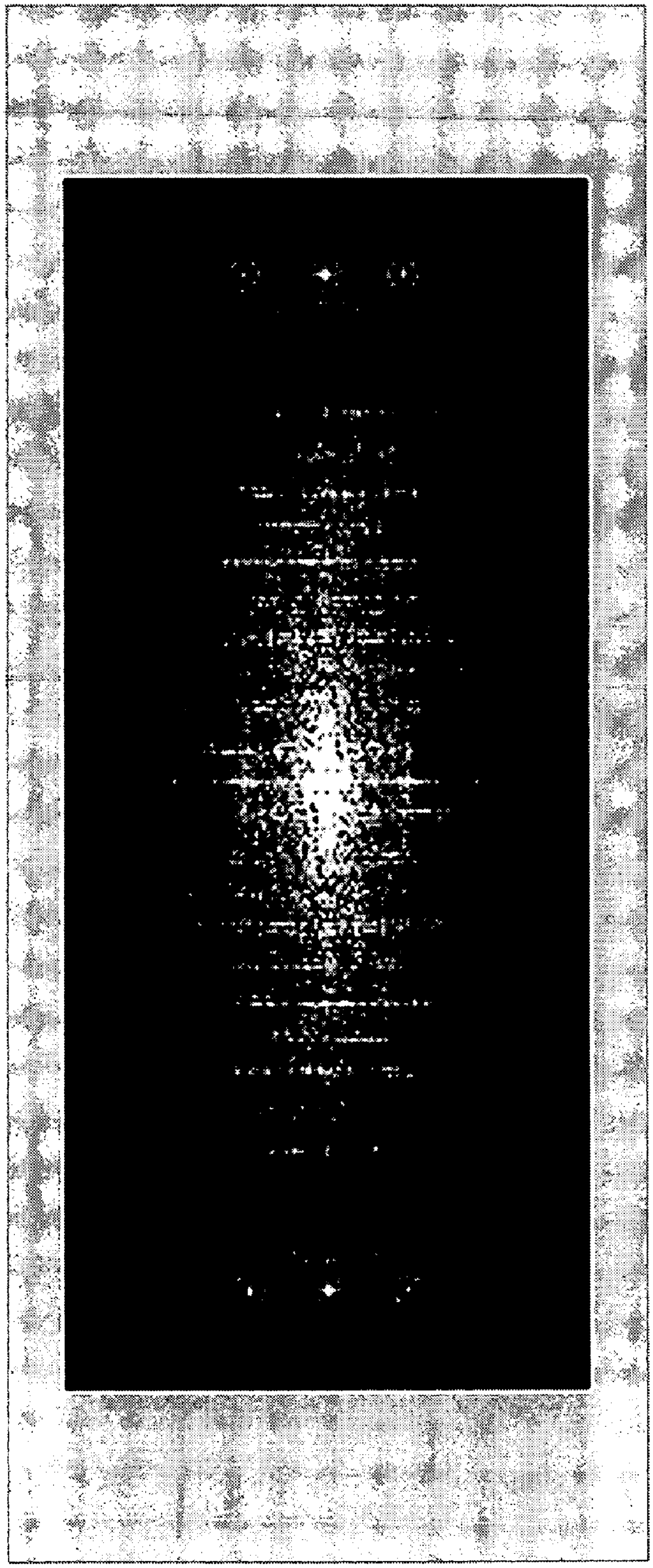
FIG. 17 depicts the power spectrum of the image of FIG. 16 after a Fast Fourier Transform is applied to the image.

To continue with the example, FIG. 16 illustrates a subject image from a known inauthentic document that tries to recreate the microprinting illustrated in FIG. 14. As can be clearly seen in FIG. 16, the microprinting in the subject image is blurred and is not as sharp as the microprinting in the reference image of FIG. 14. Once an FFT is applied to the subject digital image of FIG. 16, the power spectrum that results is shown in FIG. 17. A comparison of FIGS. 15 and 17 clearly show two different power spectra. The characteristic peaks in FIG. 15 are not present in FIG. 17 and a comparison of the two images, or at least of the peaks present in the two spectra, easily shows that the two power spectra are quite different.

Figure 18:
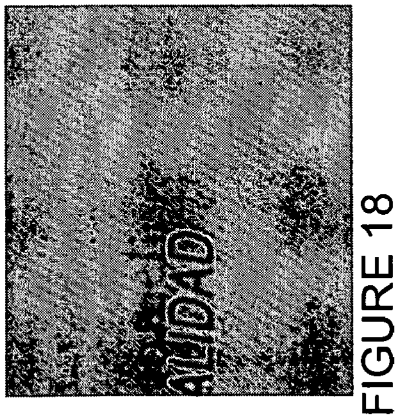
FIG. 18 illustrates a sample reference image taken from an authentic document.
Figure 19:
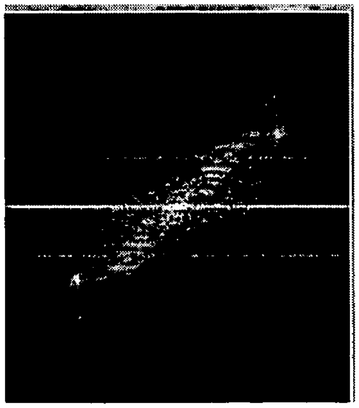
FIG. 19 illustrates a power spectrum of the image of FIG. 18.
Figure 20:
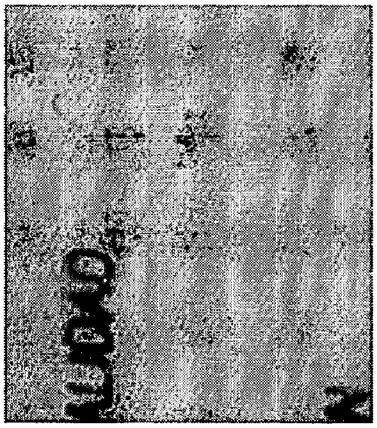
FIG. 20 illustrates a sample image taken from an inauthentic document.
Figure 21:
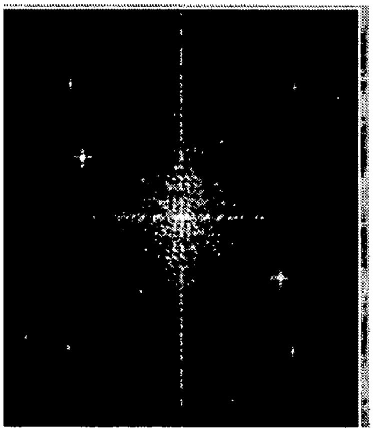
FIG. 21 illustrates a power spectrum of the image in FIG. 20.

Referring to FIGS. 18-21, another example is illustrated of how the power spectrum may be used to compare images taken from authentic and inauthentic documents. FIG. 18 illustrates a sample image taken from an authentic document. After applying a mathematical transform to the image, the power spectrum of FIG. 19 results. As can be seen from FIG. 19, the frequency that corresponds to the repeating line sequence in the background of FIG. 18 is located in the lower right quadrant of the power spectrum. FIG. 20 illustrates an image taken from an inauthentic document. After applying a mathematical transform to the image, the power spectrum of FIG. 21 results. As can be seen, the relevant frequency that should correspond to a repeating line sequence, and which should be found in the lower right quadrant, is missing from the lower right quadrant of FIG. 21. Also, a frequency which is not present in the power spectrum of FIG. 19 is found in the upper right quadrant of FIG. 21 (see upper right quadrant of FIG. 21). The presence of this unexpected frequency in the upper right quadrant and the absence of the expected frequency in the lower right quadrant is indicative of the absence of the repeating line sequence from the background of the image in FIG. 20.

It should be noted that the power spectrum of the reference image need not be stored in the database. Rather, the analyzed data from the reference power spectrum of the reference image is stored for comparison with the data gathered from the analysis of the power spectrum of the subject image. The subject image is, in this case, received by the analysis module 830 that applies the FFT and extracts the relevant data (such as the size and location of the peaks in the power spectrum) from the resulting power spectrum image.

The analysis module 830 analyzes the results of the application of a mathematical transform to the subject image and produces a result that is mathematically comparable with the stored reference data. In the power spectrum example, the analysis module 830 determines which frequencies are present, which peaks are present in the power spectrum, and how many peaks there are in the spectrum. For this analysis, the subject power spectrum is filtered to remove frequencies outside a predetermined frequency range. Thus, frequencies outside the stored range of fmin and fmax are discarded. Then, a threshold is applied to the remaining frequencies—if a frequency value is below the stored threshold, then that frequency cannot be a peak. Once these conditions are applied, then the other peak conditions (the conditions which determine if a point on the power spectrum is a peak or not) are applied to the remaining points on the subject power spectrum. These peak conditions may be as follows with (x,y) being the coordinates for a point on the subject power spectrum:

Value(x,y)>Value(x−1,y)
Value(x,y)>Value(x+1,y)
Value(x,y)>Value(x,y−1)
Value(x,y)>Value(x,y+1)
Value(x,y)>Value(x−1,y−1)
Value(x,y)>Value(x+1,y+1)
Value(x,y)>Value(x−1,y+1)
Value(x,y)>Value(x+1,y−1)
Value(x,y)>Threshold A minimum distance between peaks is also desired so that they may be differentiated. As such, an extra condition is applied to each potential peak:

```
IF Value(x,y) = peak
    RADIUS = (x−x1)^2 + (y−y1)^2
    IF (Value(x1, y1) = peak) AND (RADIUS <
    THRESHOLD_RADIUS)
        Value(x1,y1) is not peak
    END
END
```

With (x,y) being a point on the spectrum, (x1,y1) being another point on the spectrum, and THRESHOLD_RADIUS being the minimum desired distance between peaks, the above condition ensures that if two potential peaks are too close to one another, then the second potential peak cannot be considered a peak.

Once the above analysis is performed on the subject power system, then the number of peaks found is returned as the result of the analysis module 830. The reference power spectrum should have also undergone the same analysis and the number of peaks for the reference power spectrum may be stored in the database as the reference data.

After the number of peaks is found for the subject power spectrum, this result is received by the comparison module 860. The reference data from reference security documents, in this case the number of peaks for the reference power spectrum, is then retrieved by the data retrieval module 850 from the database 160 and is passed on to the comparison module 860. The comparison module 860 compares the reference data with the result from the analysis module 830 and the result is passed to the score generation module 870. The comparison module 860 quantifies how different the reference data is from the result received from the analysis module 830.

When the score generation module 870 receives the result of the comparison module, the score module 870 determines, based on predetermined criteria, a score to be given to the subject security document 140 relative to the feature being examined. As an example, if the reference data had 100 peaks while the subject spectrum only had 35 peaks, then the score module may give a score of 3.5 out of 10 based on the comparison module providing a difference of 65 between the reference data and the subject data. However, if it has been previously determined that a 50% correlation between two authentic documents is good, then the same 35 peaks may be given a score of 7 out of 10 (i.e. to double the raw score) to reflect the fact that a large correlation between the peak numbers is not expected. This score generation module 870 may also, depending on the configuration, take into account other user selected factors that affect the score but that may not be derived from the subject image or the type of security document (e.g. setting a higher threshold for documents from specific countries).

While the above examples use an FFT as a mathematical transform applied to the subject image and a power spectrum signature as the representation of the characteristics of the feature being examined, other options are also possible. As an example, a color histogram of a specific region of the subject image may be generated by the analysis module 830 which also measures the various distributions of color within the resulting histogram. The distributions of color in the subject histogram would then be passed on to the comparison module 860 for comparison with the distributions of color from an authentic document. Clearly, the distributions of color from an authentic document would also have been generated or derived from a color histogram of a similar region in the authentic document. This method would be invariant to rotation in that regardless of the angle of the region being examined, the histogram would be the same.

Similarly, a pattern or contour matching based histogram may also be used to compare the features of an authentic document with a subject document. Once a specific feature of the security document has been localized, the contour of that feature (e.g. a maple leaf design, an eagle design, or a crest design) may be obtained by applying any number of edge detector operators by way of the analysis module 830. With the contour now clearly defined, the analysis module 830 can then follow this contour and measure the number of turns of the contour line in all the eight possible directions. A histogram of the turns can then be generated and normalized by subtracting the average value of the turns from every point of the histogram. The resulting normalized histogram of the contour changes would therefore be scale independent. Histograms for a specifically shaped feature should therefore be the same regardless of the size (or scale) of the feature. Thus, a large maple leaf feature should have the same histogram for a smaller maple leaf feature as long as the two features have the same shape. Thus, the details regarding a normalized contour histogram of a feature with a specific shape or pattern from a reference security document can be stored in the database (e.g. the distribution of the directions of the contours or other distinguishing characteristics of the reference histogram). This reference histogram can then be compared to the normalized contour histogram of a similar feature in a subject security document as produced by the mathematical transform module 820. The subject histogram can then be analyzed by the analysis module 830 to produce its distinguishing characteristics. The distinguishing characteristics of the subject histogram and of the reference histogram can then be compared by the comparison module 860.

As noted above, the processes and analysis provided may be used to assist in determining an authenticity or inauthenticity of a subject document. The methods used in the manufacture of the subject document can be used as one of the bases by which a document's authenticity or inauthenticity is determined.

Figure 23:
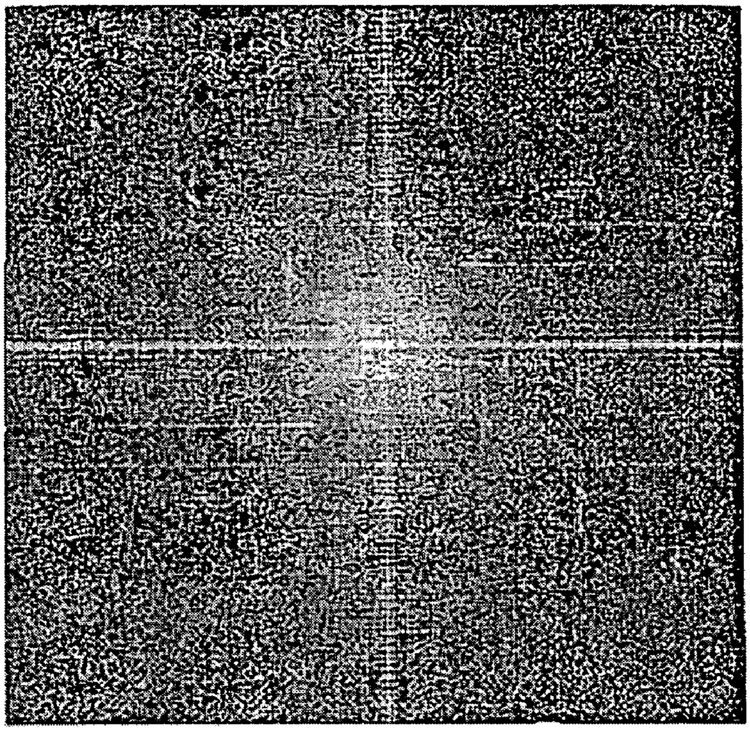
FIG. 23 illustrates a power spectrum of the image of FIG. 22.
Figure 22:
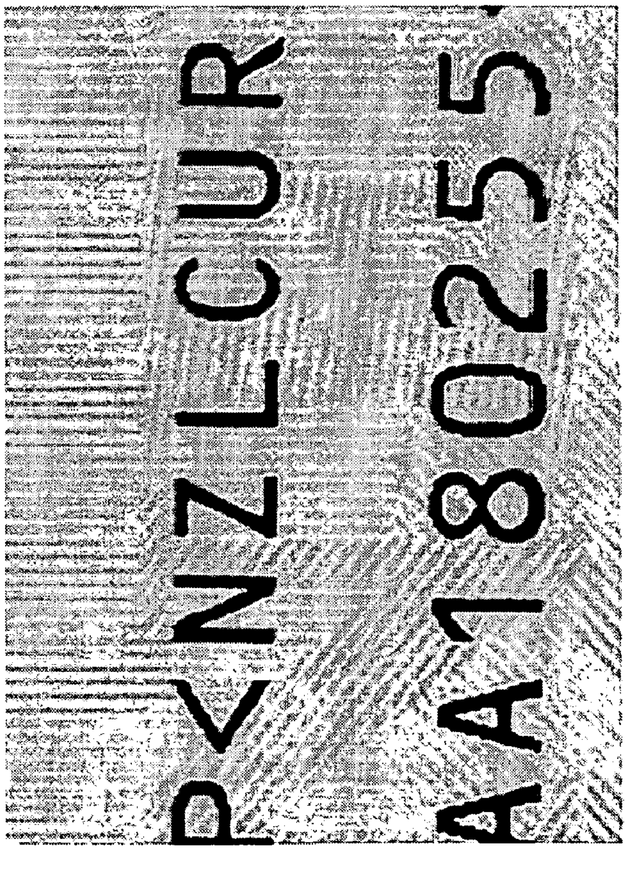
FIG. 22 illustrates a background of a document with a multiplicity of variously skewed lines.

One example of the above is that of testing the consistency in the printing that repeats itself. Consistency, in this sense, refers to the consistency of the sharpness of the edges of a printed feature, the consistency of the contrasts in the printing, and the consistency of the size of the printed elements. Referring to FIG. 22, a section of a security document is illustrated as being isolated and localized from a larger image of a page of the document. As can be seen, the sequence of lines in the background are a mixture of skewed lines (+/−45 degrees of skew), vertical lines, and lines skewed at smaller angles (approximately −30 degrees). By applying a mathematical transform to the image, the power spectrum illustrated in FIG. 23 results. The circled portions of the spectrum illustrates the frequencies generated by the differently skewed lines. An inauthentic document which does not reproduce the sharpness of the edges or the contrast of the printing of the background lines would produce a different spectrum. As such, comparing the expected frequencies (their location and number) as circled in FIG. 23 with the frequencies extracted from a subject document will provide a measure of the similarity between the backgrounds of a known authentic document and a subject document.

Figure 25:
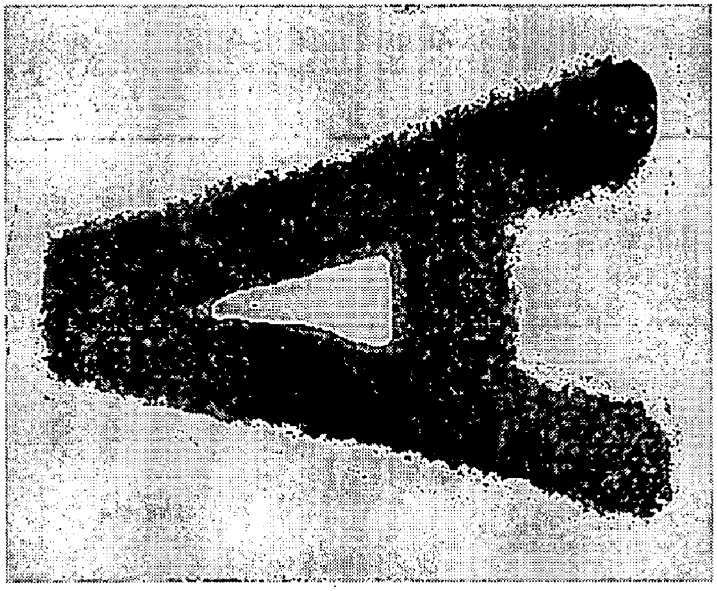
FIG. 25 illustrates a letter from an inauthentic document on which a contour tracking process can be applied for comparison with the letter in FIG. 24.
Figure 24:
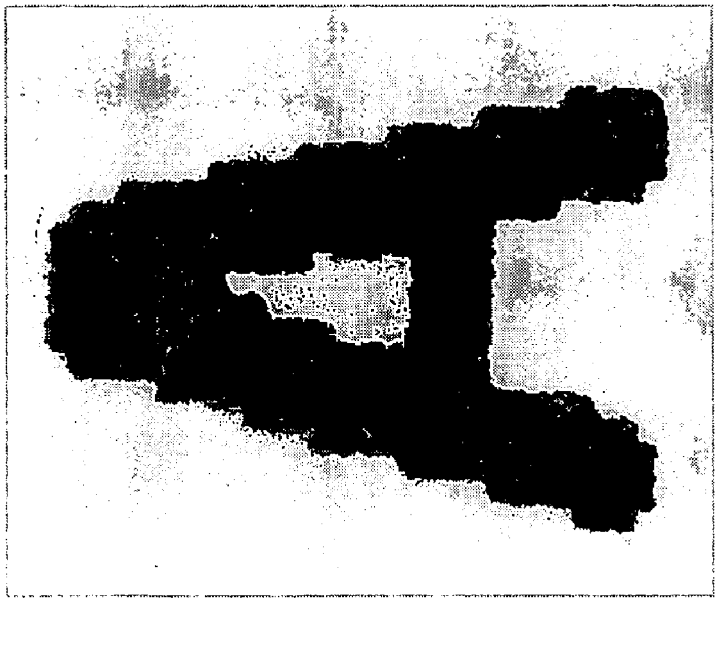
FIG. 24 illustrates a letter from an authentic document on which a contour tracking process can be applied.

Another example of how the above noted techniques may be used is illustrated using FIGS. 24 and 25. As can be seen, the figures illustrate two instances of the letter A. The specific letter may be isolated/localized by first finding the MRZ on the document and obtaining a digital image of the zone. Then, either a pattern recognition/pattern matching process (with a specific letter's pattern being used as the pattern to be matched) can be used to locate a specific letter. To simplify such a process, a well known technique as thresholding can be used to create a binary image from the digital image of the MRZ. Thresholding processes such as those that are histogram based or those based on the Otsu process may be used.

Referring to FIGS. 24 and 25, FIG. 24 is taken from an authentic document while FIG. 25 is taken from an inauthentic document. As can be seen, the authentic image has a stair-like contour while the inauthentic image has a relatively smooth contour. A contour tracking process can be used to differentiate the two and to determine that the inauthentic image does not match the authentic image. The contour tracking process, a well-known process, would track the edge of the authentic image and track the number of an character of the direction changes. Thus, the letter in FIG. 24 would have a preponderance of direction changes in the east-west and north-south directions. The letter in FIG. 25 would have higher values in the northwest-southeast and northeast-southwest directions. Thus, the expected numbers for the different direction changes for the authentic image can be stored in the database and can be retrieved for comparison with the numbers obtained for the subject image. Clearly, while this example only uses the letter A, other letters or characters may be used.

Figure 27:
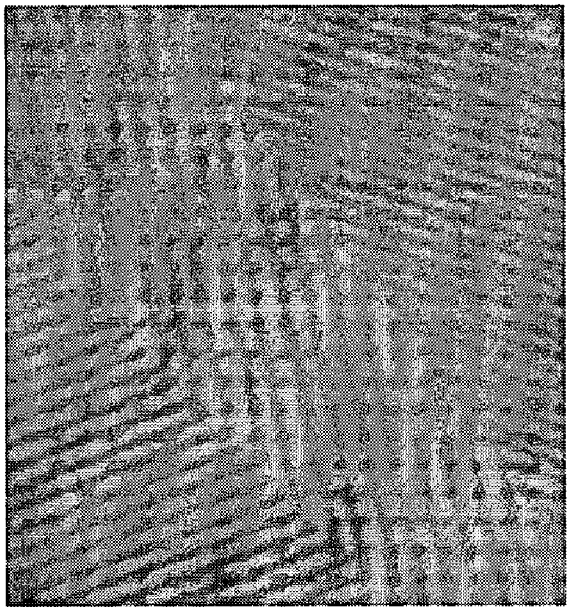
FIG. 27 illustrates the linework from an inauthentic document which can be compared to the linework in FIG. 26 using a repetitive pattern analysis.
Figure 26:
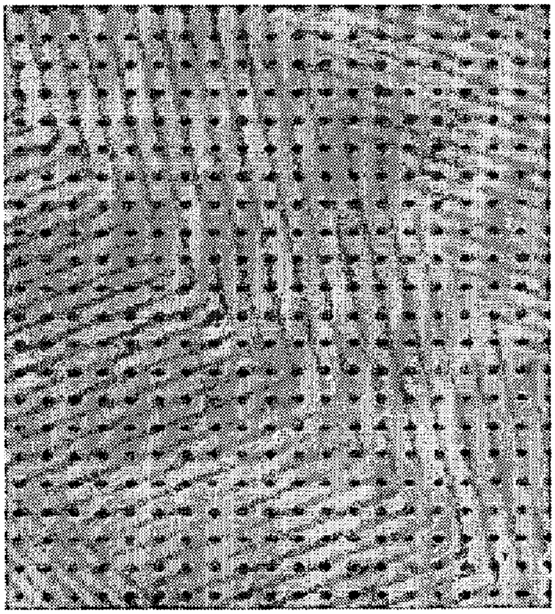
FIG. 26 illustrates the linework from an authentic document.

A further example of the use of the above techniques is provided with reference to FIGS. 26 and 27. The linework of an authentic document is illustrated in FIG. 26 while an attempt at reproducing the same linework in an inauthentic document is illustrated in FIG. 27. To differentiate the two, the technique used above for repetitive patterns (using a Fast Fourier Transform on the images and deriving data from the resulting power spectrum) may be used. Since the dots repeat at a constant distance in space in the authentic document, applying the FFT and resulting power spectrum will show this repeating pattern. Clearly, the power spectrum of the image in FIG. 27 will not show a similar pattern.

Figure 29:
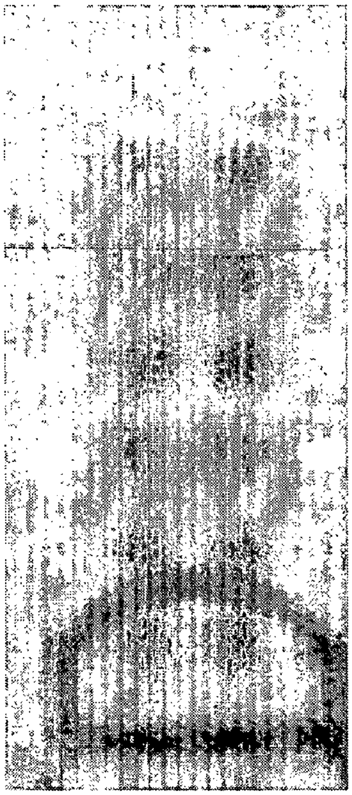
FIG. 29 illustrates an attempt at reproducing the solid color region from FIG. 28.
Figure 28:
FIG. 28 illustrates a solid color region from an authentic document.

The technique used to detect repetitive patterns can also be used to detect an inauthentic document by showing that a repetitive pattern exists where one should not. Referring to FIGS. 28 and 29, two images illustrating similar solid color regions printed used different printing techniques is illustrated. The image in FIG. 28 is from an authentic document and, if an FFT is applied to the image, a repetitive pattern would not emerge in the power spectrum. Conversely, applying an FFT to the image in FIG. 29 would reveal a repetitive pattern in the resulting power spectrum. The power spectrum of the image in FIG. 29 would produce a peak along the north-south direction. As can be seen, the printing technique used for the document in FIG. 29 sought to reproduce a solid region by using a series of lines. Other printing techniques may use a series of tiny dots for the same ends. Such techniques can be detected by using the above method on a sufficiently magnified digital image. Thus, if an authentic document was printed using a printing or manufacturing process that did not produce repetitive patterns, then applying an FFT to a subject image will produce a power spectrum in which a repetitive pattern is not expected. If a repetitive pattern is detected in the power spectrum of the subject image, then the subject document probably was not produced using the expected printing or manufacturing process.

Figure 31:
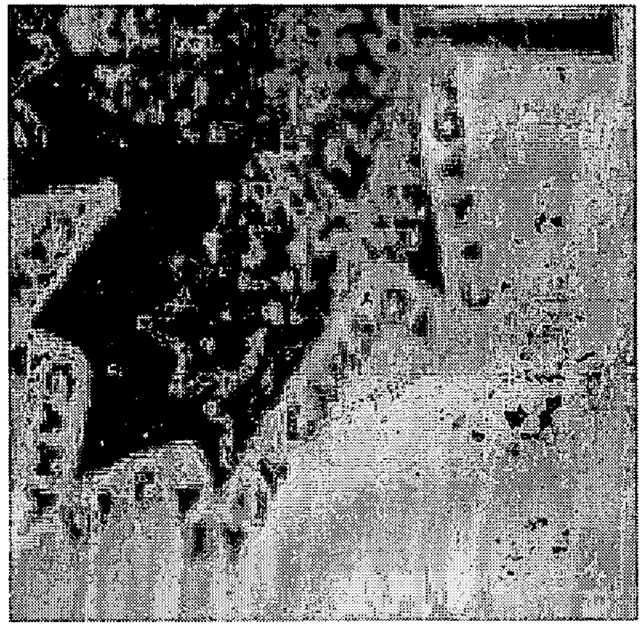
FIG. 31 illustrates an absence of a reflectivity pattern for an attempted hologram in an inauthentic document.
Figure 30:
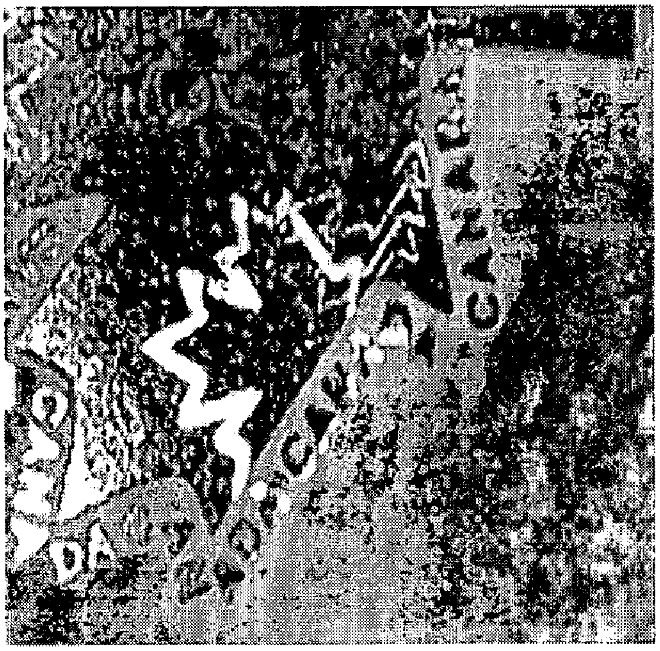
FIG. 30 illustrates a reflectivity pattern for an authentic hologram.

One of the more common security features used nowadays in security documents such as passports are holograms. Depending on the security document, varying numbers of holograms may be used at different locations on a single document. To detect inauthentic holograms, the unique reflectivity pattern of authentic holograms in directional light can be taken advantage of. Referring to FIGS. 30 and 31, images of an authentic hologram (FIG. 30) and an inauthentic hologram are presented. As can be seen, if the hologram in FIG. 30 is illuminated by directional light, the maple leaf pattern and other features in the hologram become more visible. The inauthentic hologram in FIG. 31, on the other hand, does not have any reflectivity when exposed to directional light.

This feature of the hologram can be used by exposing the subject document o directional light and isolating/localizing the area where a hologram is expected. A digital image of the expected hologram area exposed to directional light can then be taken. The resulting digital image can then used when applying the cross-correlation technique explained above with an authentic image. The resulting score would provide and indication of the similarities or dissimilarities between the subject image under directional light and a stored image of an authentic hologram under directional light. Returning to the example, since the maple leaf pattern and other reflective elements would be more visible in the authentic hologram, then the degree of similarity, and hence the matching score between the two images, would be lower than expected.

Figure 33:
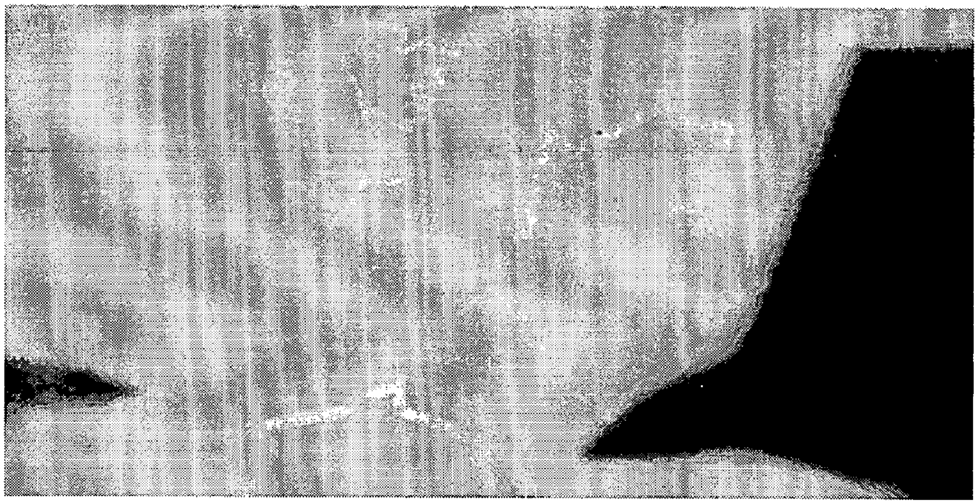
FIG. 33 illustrates an inauthentic laminate when exposed to directional light.
Figure 32:
FIG. 32 illustrates a laminate from an authentic document when exposed to directional light.

The use of directional light to illuminate the subject documents may also be used on features other than holograms. Some security documents, such as passports, are covered by a laminate which has reflective elements. Referring to FIGS. 32 and 33, images of an authentic document's laminate under directional light (FIG. 32) and an inauthentic laminate under a similar direction light are illustrated.

As can be seen in the Figures, the authentic document's laminate reflects more and, because of this, artifacts on the laminate (such as the maple leaf patterns) are visible. Conversely, the inauthentic document does not fully reflect and parts of the laminate are not visible. A pattern matching process, perhaps based on the normalized cross-correlation process explained above, used on the two images would reveal a fairly low level of similarity between the two images. The low level of similarity would result in a low score for the subject image.

Another use of directional light relates to intaglio printing. If intaglio printing is expected on a subject document, the presence or absence of such raised printing can be detected using directional illumination and histograms. For this process, an image of the selected portion of the document where intaglio printing is expected is taken with illumination being at 90 degrees to the document. Then, a second image of the same area, with illumination being at an angle other than 90 degrees, is taken. Histograms of the two images are then generated and compared to one another. The comparison should show significant dark areas (or shadows) in the histogram of the second image. However, if the printing is not intaglio, then a comparison of the two histograms should not produce a significant difference as shadows would not be formed.

It should be noted that the above methods may also be used to extract and compare not only the clearly visible features of a security document (e.g. microprinting, color of specific area, identifying indicia such as the maple leaf design) but also non-visible and hidden features as well. As noted above, the scanner may be used to properly illuminate the subject document and reveal the presence (or absence) of security features embedded on the security document. The above-noted invention may be used to compare features that can be digitally scanned to provide a digital image. The scanner may be any suitable type of imaging device.

Figure 34:
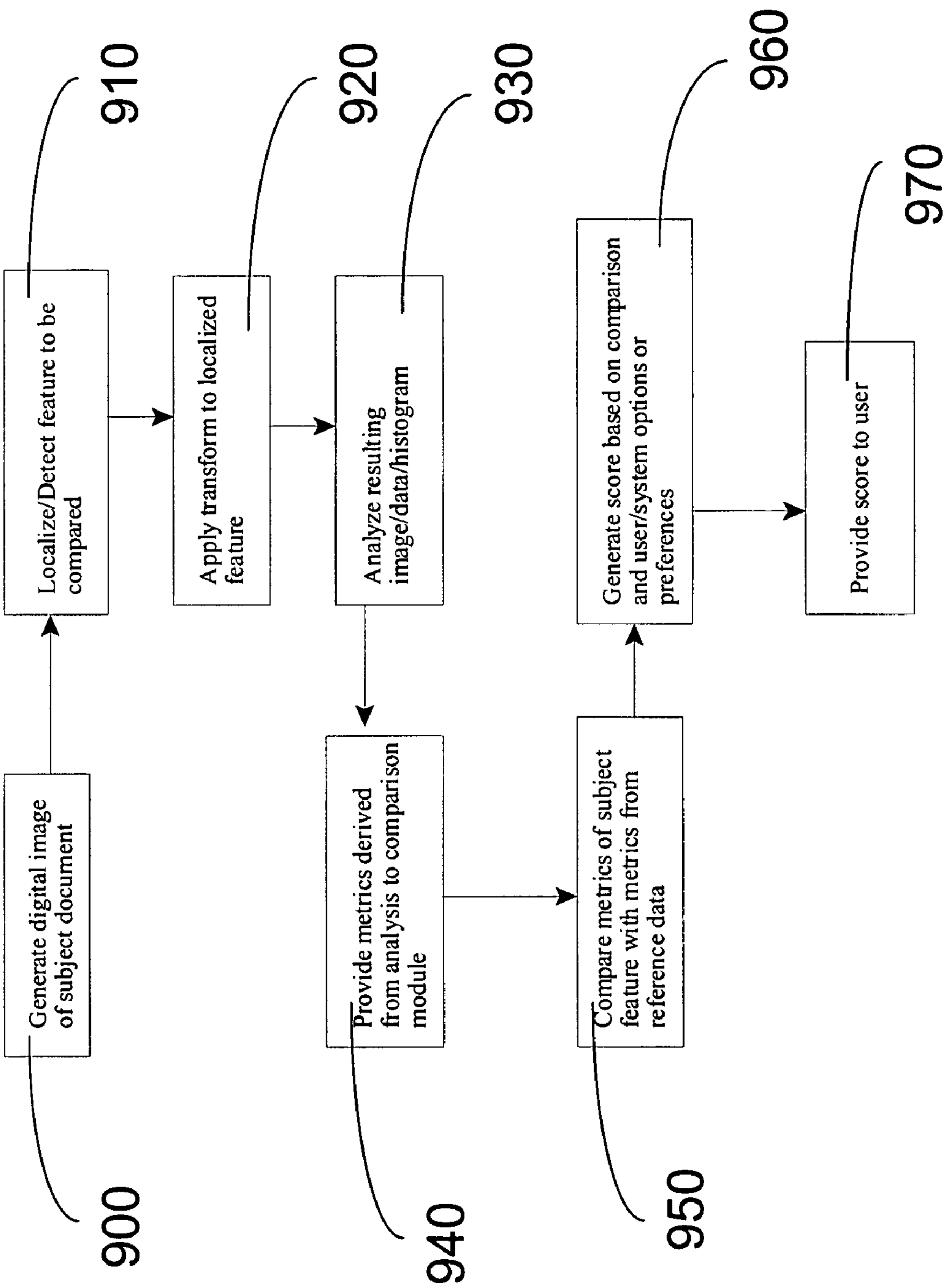
FIG. 34 depicts a block diagram illustrating the steps in the generalized approach to comparing and scoring a feature in a subject document relative to data from a known similar feature in an authentic document.

The above options may all be used together to arrive at different scores for different features on the same security document. These different scores may then be used to arrive at an aggregate or a weighted overall score for the subject security document. As noted above, the aggregate or weighted overall score may then be provided to an end user as an aid to determine whether the subject security document is authentic or not. Referring to FIG. 34, a block diagram or flowchart of the generalized steps taken in the process explained above is illustrated. Beginning at step 900, the process starts with the generation of a digital image of the security document to be examined for features. This step is executed in conjunction with the scanner that actually scans and obtains the digital image of the document or page under examination.

The next step is that in step 910, localizing and isolating or detecting the feature to be examined. This step is performed by the feature/localization module 810 and the step determines where the feature to be examined is in the document by searching the document for a match with a reference image of the feature. This step can also be performed by merely locating an MRZ on the subject document and isolating one or more letters in the MRZ. These letters may then be used as the subject of the analysis.

Step 930 analyzes the data/image/histogram generated by the analysis module 830. The analysis may involve applying a mathematical transform to the image of the localized or isolated feature. The transform may be the application of an FFT, the application of an edge detector operator, generating a histogram (color or contour) of the feature, or the application of any other mathematical or image processing method. The analysis then extracts the useful data from the result and this analysis can take various forms. From the examples given above, the analysis may take the form of determining distances between elements in the histogram, determining the number, height, and/or presence of peaks in a power spectrum, and any other analysis that extracts the identifying characteristics of the result after that application of a mathematical transform. These identifying characteristics or metrics should be easily quantifiable and should be easy to compare mathematically with reference data stored in the database.

Step 940 provides the metrics from the analysis to the comparison module 860 to determine how quantifiably similar or different the feature of the subject document is from reference data. Also in this step may be the step of retrieving the reference data from the database.

Step 950 actually compares the metrics from the feature of the subject document with the reference data from the database. The comparison may be as simple as subtracting one number from another such that if there is an exact match, then the result should be zero. Results other than zero would indicate a less than perfect match. Alternatively, the comparison step 950 may determine a percentage that indicates how different are the two data sets being compared. From the above example of 35 peaks for the subject document and 100 peaks for the reference data, the comparison step could provide a result that notes that there is a 65% incompatibility or non-match between the two results.

Step 960 generates the final score indicative of a similarity or non-similarity between the subject feature and the reference data derived from the reference feature. As noted above, this step may take into account user or system mandated preferences that would affect the final score.

The final step 970 is that of presenting the final score to the end user as an aid to determining if the subject security document is authentic or not. It should be noted that this final step may include aggregating and/or weighting the scores of multiple different features tested/compared on the subject security document prior to providing a final score to the user.

Figure 35:
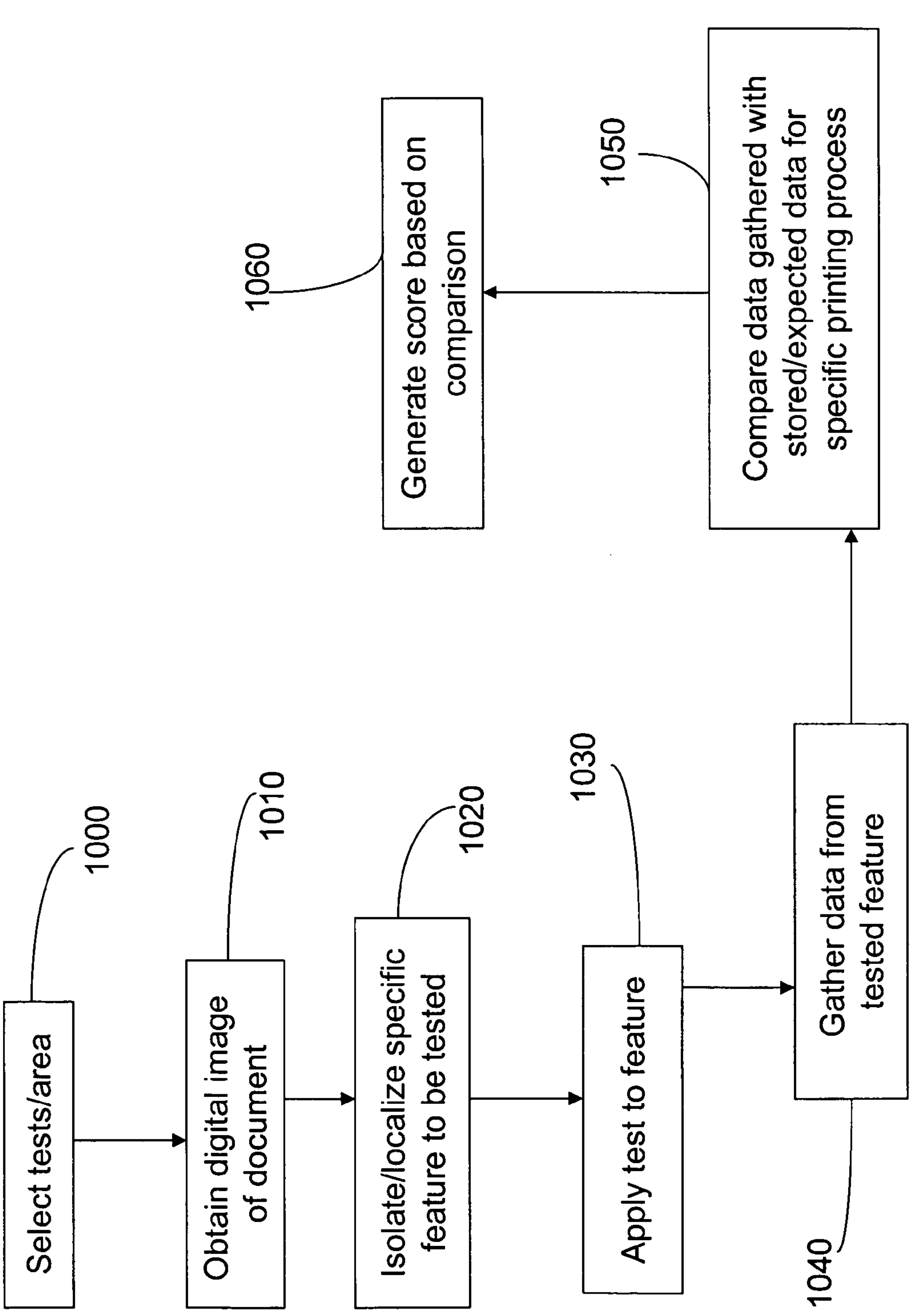
FIG. 35 depicts a flowchart illustrating the steps in a method for determining a printing process used to manufacture a subject document using the techniques described in this document.

The above system and processes may also be used in a more directed manner for a more specific end—the determination of whether a specific document was manufactured or printed using a specific manufacturing or printing process. For this specific use, the system and processes described above would be utilized according to a process as outlined in the flowchart of FIG. 35.

The process begins with the selection (step 1000) of either a test t obe applied to the document or an area of the document to be tested. As an example, the subject document may be subjected to a test for the background of the document or a test for a hologram in the document. Similarly, an area of the subject document, such as one having a specific image, text, or symbol, can be selected.

Step 1010 is that of obtaining a digital image of the document. As noted above, this may be done using the scanner/image device of the system described above.

Step 1020 then isolates the feature or area to be tested. This feature may be the hologram, a background, a specific letter in a machine readable zone, or a portion of the laminate. This feature may be any section of the document which can be subjected to analysis.

Once the relevant area or feature has been isolated or localized, step 1030 is that of applying the test to the feature. This step can take the form of applying a mathematical transform to the image, illuminating the document with directional light (prior to obtaining a digital image), applying a histogram to the digital image, applying a contour tracking process to the feature, or any combination of the above. This step may also encompass the application of any number of processes to either the digital image or a manipulation of the document prior to the taking of the digital image.

Once the test has been applied in step 1030, the data from the test is then gathered in step 1040. This step covers the analysis of the resulting power spectrum of an image, the analysis of a histogram, a determination of the number and direction of contour changes, and any other analysis steps. This step may also cover the obtaining of the image of a document after the document has been illuminated by directional light. This step gathers the data to be compared to the expected data stored in a database.

Step 1050 is that of comparing the data gathered in step 1040 with data retrieved from a database or with other data. This data retrieved from a database relates to expected metrics for a specific printing or manufacturing process. As an example, a power spectrum for a document background with microprinting produced by a specific printing process may have a specific range of peaks in a specific portion of the spectrum. If the same range of peaks is present in the spectrum of the subject document, then this could indicate that the same printing method may have been used to produce the subject document. Similarly, the data generated in step 1040 may be the image of a hologram or laminate illuminated by directional light while the data retrieved from the database would be a similar, albeit confirmed authentic, hologram or laminate also illuminated by a similar directional light. The comparison can therefore be the application of the normalized cross-correlation process between the two images. As noted above, another possible comparison would be a comparison of the number and direction of contour changes for at least one letter from a machine readable zone. Yet another possibility would be the comparison of two images (taken at different angles) of the same printing to determine if intaglio printing was used.

The final step, step 1060, is that of generating a score based on the results of the comparison. The score may be an indication of similarity or differences between the data from the database and the data gathered from the feature on the subject document. Depending on the implementation and the user's preferences, a higher score may indicate a higher likelihood that the subject document was produced or printed using a technique similar to that use to produce the document from which the data in the database was derived from. Of course, no single test may be able to definitively determine the manufacturing or printing process used to create a document. As such, the score may be an aggregate, weighted or otherwise, of scores generated by multiple tests applied to the same document. For such an implementation, the process illustrated in the flowchart of FIG. 35 may be repeated for each test applied to the document with a score generated for each test. A final step that collates and possibly weighs the various scores generates the final score that indicates the likelihood that the document was produced using a given printing or manufacturing technique.

It should be noted that the data in the database may not merely relate to data from authentic documents but may relate to inauthentic documents as well. As an example, if a subject document is suspected of being produced by an inkjet based printing process while an authentic document is known to be produced by a process other than an inkjet based process, the tests in the process given above may confirm if the subject document was produced using inkjet technology. For such tests, the data in the database would therefore have to be derived from known inauthentic documents created using inkjet based techniques.

Figure 36:
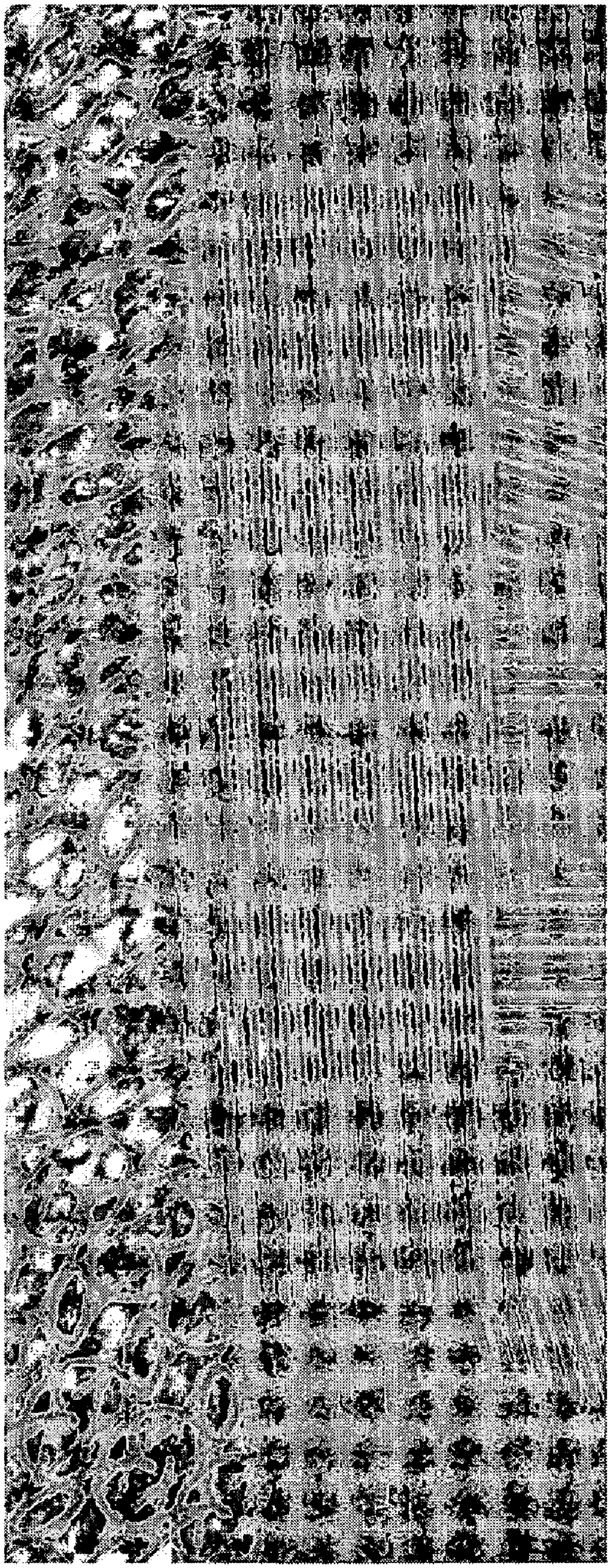
FIG. 36 illustrates an original background containing a hidden pattern.
Figure 37:
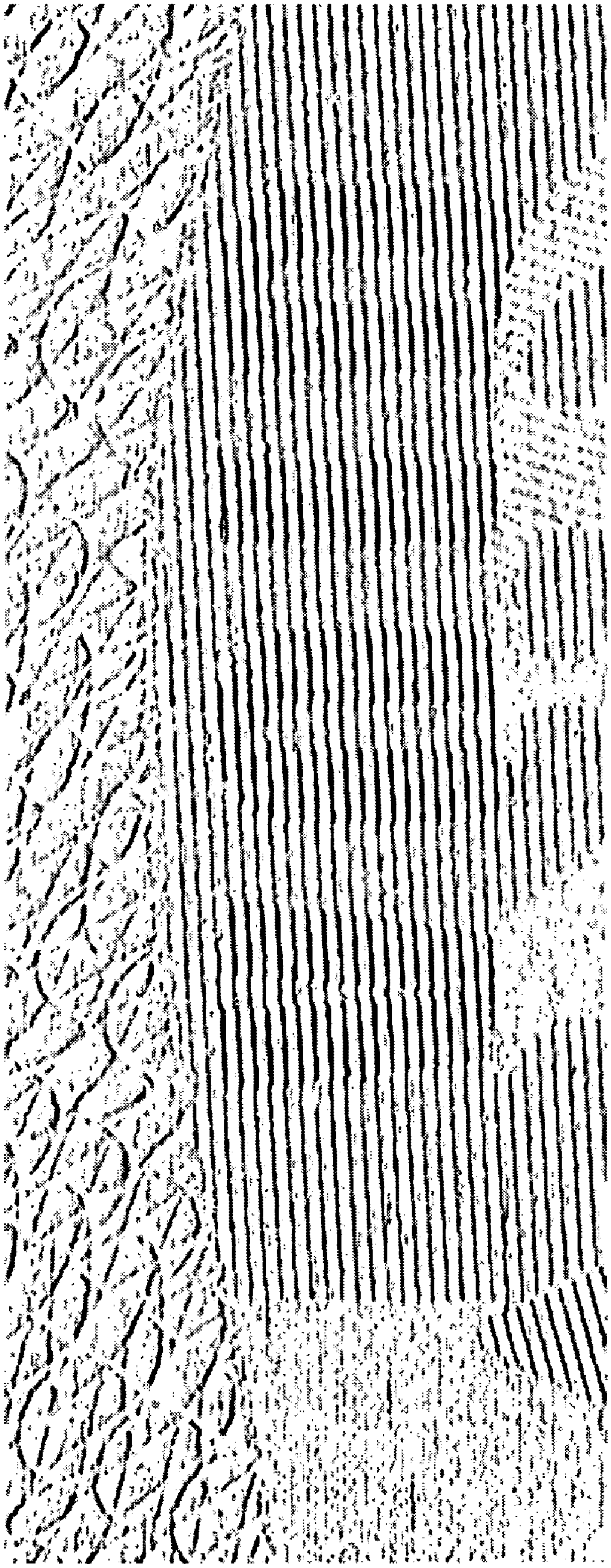
FIG. 37 illustrates the background of FIG. 36 after copying and which shows the hidden pattern.

As noted above, inauthentic documents or documents which are known forgeries may also be used as reference documents. Known features of inauthentic documents, especially those left by the techniques used to manufacture the inauthentic documents, may be used as the reference by which subject documents are judged or compared against. One example of such a feature are hidden patterns in authentic documents that appear if these authentic documents are copied or otherwise improperly used. Referring to FIG. 36, an image of a background of an authentic document is illustrated. If this authentic document was copied in a conventional manner (e.g. by way of a photocopier), a hidden pattern, illustrated in FIG. 37 appears. The image of the hidden pattern (the word VOID in the example) may be used as the reference image which will be processed and against which the subject document is compared with. As explained above, if the subject document's feature closely correlates with the feature of the inauthentic document (such as the image in FIG. 23), then this increases the possibility that the subject document is inauthentic. Thus, instead of using the invention to determine the presence of features expected in authentic documents and created by the manufacturing processes used to create the authentic documents, the invention may also be used to determine the presence of features expected in inauthentic documents due to how these inauthentic documents may have been produced.

Embodiments of the method explained above can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

We claim:

1. In a document comparison system having a document reader communicating with a document inspection engine and configured for assessing whether a document read by the document reader is authentic, a method of analyzing a texture feature of the document for comparison with an expected texture feature characteristic of a predetermined printing method used to manufacture the document, the method comprising:

a) obtaining a digital image of at least a portion of the document comprising a texture feature which is characteristic of the predetermined printing method used to manufacture the document;

b) obtaining data for the document from an analysis of the texture feature of the digital image;

c) comparing the data for the document obtained in step b) with expected data for the expected texture feature; and, d) generating a score based on a comparison between the obtained data for the document and the expected data;

whereby the score is useful to assess whether the document is authentic by indicating whether the document was manufactured by the predetermined printing method.

2. A method according to claim 1 whereby the predetermined printing method comprises inkjet printing.

3. A method according to claim 1 whereby the texture feature is printed matter.

4. A method according to claim 3 whereby the predetermined printing method is intaglio printing and step a) comprises obtaining a first digital image of the at least one portion of the document when it is directionally illuminated at 90 degrees and obtaining a second digital image of the at least one portion of the document when it is directionally illuminated at an angle other than 90 degrees.

5. A method according to claim 4 whereby step b) comprises generating histograms for the first and second digital images.

6. A method according to claim 1 comprising applying a normalized cross-correlation between the obtained digital image of the texture feature of the document and a digital image of the expected texture feature.

7. A method according to claim 5 whereby the texture feature of the obtained digital image is isolated by applying normalized cross-correlation.

8. A method according to claim 6 comprising applying an edge tracking process to the texture feature of the obtained digital image.

9. A method according to claim 3 whereby the obtained data for the document comprises direction and contour changes of one or more portions of the printed matter of the texture feature of the obtained digital image.

10. A method according to claim 9 whereby the obtained data for the document and the expected data comprise histograms.

11. Non-transitory computer readable media having embodied thereon computer instructions for executing a method of analyzing a texture feature of a document for comparison with an expected texture feature characteristic of a predetermined printing method used to manufacture the document, the method comprising:

a) obtaining a digital image of at least a portion of the document comprising a texture feature which is characteristic of the predetermined printing method used to manufacture the document;

b) obtaining data for the document from an analysis of the texture feature of the digital image;

c) comparing the data for the document obtained in step b) with expected data for the expected texture feature; and, d) generating a score based on a comparison between the obtained data for the document and the expected data;

whereby the score is useful to assess whether the document is authentic by indicating whether the document was manufactured by the predetermined printing method.

12. Non-transitory computer readable media according to claim 11 whereby the predetermined printing method comprises inkjet printing.

13. Non-transitory computer readable media according to claim 11 whereby the texture feature is printed matter.

14. Non-transitory computer readable media according to claim 13 whereby the predetermined printing method is intaglio printing and step a) comprises obtaining a first digital image of the at least one portion of the document when it is directionally illuminated at 90 degrees and obtaining a second digital image of the at least one portion of the document when it is directionally illuminated at an angle other than 90 degrees.

15. Non-transitory computer readable media according to claim 14 whereby step b) comprises generating histograms for the first and second digital images.

16. Non-transitory computer readable media according to claim 11 comprising applying a normalized cross-correlation between the obtained digital image of the texture feature of the document and a digital image of the expected texture.

17. Non-transitory computer readable media according to claim 16 whereby the texture feature of the obtained digital image is isolated by applying normalized cross-correlation.

18. Non-transitory computer readable media according to claim 17 comprising applying an edge tracking process to the texture feature of the obtained digital image.

19. Non-transitory computer readable media according to claim 13 whereby the obtained data for the document comprises direction and contour changes of one or more portions of the printed matter of the texture feature of the obtained digital image.

20. Non-transitory computer readable media according to claim 19 whereby the obtained data for the document and the expected data comprise histograms.

* * * * *